United States Patent
Bakker et al.

(10) Patent No.: US 9,420,447 B2
(45) Date of Patent: *Aug. 16, 2016

(54) CONTENT DISPOSITION SYSTEM AND METHOD FOR PROCESSING MESSAGE CONTENT IN A DISTRIBUTED ENVIRONMENT

(71) Applicant: BlackBerry Limited, Waterloo (CA)

(72) Inventors: Jan Hendrick Lucas Bakker, Fort Worth, TX (US); Adrian Buckley, Tracy, CA (US); Andrew Michael Allen, Hallandale Beach, FL (US)

(73) Assignee: Blackberry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,457

(22) Filed: Nov. 2, 2015

(65) Prior Publication Data

US 2016/0057601 A1 Feb. 25, 2016

Related U.S. Application Data

(63) Continuation of application No. 13/846,208, filed on Mar. 18, 2013, now Pat. No. 9,178,932, which is a continuation of application No. 12/256,169, filed on Oct. 22, 2008, now Pat. No. 8,407,299.

(60) Provisional application No. 61/015,003, filed on Dec. 19, 2007, provisional application No. 60/983,174, filed on Oct. 27, 2007.

(51) Int. Cl.
*G06F 15/16* (2006.01)
*G06F 15/173* (2006.01)
(Continued)

(52) U.S. Cl.
CPC ............. *H04W 4/22* (2013.01); *H04L 65/1006* (2013.01); *H04L 65/1016* (2013.01); *H04L 67/02* (2013.01); *H04W 88/02* (2013.01)

(58) Field of Classification Search
CPC .. H04L 67/02; H04L 65/1006; H04L 65/1016
USPC .................. 709/206, 246, 207, 230
See application file for complete search history.

(56) References Cited

U.S. PATENT DOCUMENTS 5,710,908 A 1/1998 Man
5,978,847 A 11/1999 Kisor et al.
(Continued)

FOREIGN PATENT DOCUMENTS

| EP | 2458815 | 5/2012 |
|---|---|---|
| WO | 02054673 | 7/2002 |
| WO | 03094563 | 3/2003 |

OTHER PUBLICATIONS

Graham; "Supplementary Material for The XHTML Language and Design Guide"; Multipurpose Internet Mail Extensions (MIME); XP-002508742; 7 pages.

(Continued)

*Primary Examiner* — Haresh N Patel
(74) *Attorney, Agent, or Firm* — Fish & Richardson P.C.

(57) ABSTRACT

In one embodiment, a wireless mobile User Equipment (UE) device comprises a message generator configured to send a SIP request message via a first IP network and a processor configured to process a SIP response message received from a network node via the first IP network, the processor further configured to process instructions to provide a treatment for at least one message body content of the SIP response message based on a value of a content type indicator independent of at least one of an absence of a content disposition indicator, a content disposition indicator without a value and a content disposition indicator having a value. The treatment, applied by the UE device, may comprise one of: (i) performing an Emergency Services (ES) call effectuated via a CS network and (ii) performing a registration and an ES call effectuated via an IP network.

20 Claims, 16 Drawing Sheets

(51) Int. Cl.
*H04W 4/22* (2009.01)
*H04L 29/08* (2006.01)
*H04L 29/06* (2006.01)
*H04W 88/02* (2009.01)

(56) References Cited

U.S. PATENT DOCUMENTS

| | | | |
|---|---|---|---|
| 6,690,783 B2 | 2/2004 | Creamer et al. | |
| 6,789,126 B1 | 9/2004 | Saulpaugh et al. | |
| 6,792,466 B1 | 9/2004 | Saulpaugh et al. | |
| 6,944,762 B1 | 9/2005 | Garrison | |
| 6,950,875 B1 | 9/2005 | Slaughter et al. | |
| 6,970,935 B1 | 11/2005 | Maes | |
| 7,010,727 B1 | 3/2006 | Stucker | |
| 7,076,568 B2 | 7/2006 | Philbrick et al. | |
| 7,149,299 B2 | 12/2006 | Triano et al. | |
| 7,177,859 B2 | 2/2007 | Pather et al. | |
| 7,194,516 B2 | 3/2007 | Giacobbe et al. | |
| 7,218,626 B2 | 5/2007 | Shaheen et al. | |
| 7,240,285 B2 | 7/2007 | Rising et al. | |
| 7,245,900 B1 | 7/2007 | Lamb et al. | |
| 7,260,186 B2 * | 8/2007 | Zhu | H04L 29/06027 379/45 |
| 7,290,012 B2 | 10/2007 | Charlet et al. | |
| 7,366,722 B2 | 4/2008 | Doddington | |
| 7,397,775 B2 | 7/2008 | Womack et al. | |
| 7,441,032 B2 | 10/2008 | Requena | |
| 7,475,140 B2 * | 1/2009 | Requena | H04L 12/581 455/456.1 |
| 7,480,915 B2 | 1/2009 | Requena et al. | |
| 7,483,384 B2 | 1/2009 | Bryant et al. | |
| 7,539,759 B2 | 5/2009 | Narayanan et al. | |
| 7,548,948 B2 | 6/2009 | Klemets et al. | |
| 7,552,225 B2 | 6/2009 | Creamer et al. | |
| 7,596,102 B2 | 9/2009 | Forbes et al. | |
| 7,602,723 B2 | 10/2009 | Mandato et al. | |
| 7,664,883 B2 | 2/2010 | Craft et al. | |
| 7,668,159 B2 | 2/2010 | Buckley et al. | |
| 7,710,950 B2 | 5/2010 | Buckley et al. | |
| 7,774,011 B2 | 8/2010 | Sung et al. | |
| 7,796,603 B1 | 9/2010 | Bertone et al. | |
| 7,844,270 B2 | 11/2010 | Sylvain | |
| 8,000,732 B2 | 8/2011 | Albertsson et al. | |
| 8,051,287 B2 | 11/2011 | Shetty et al. | |
| 8,155,077 B2 | 4/2012 | Grayson | |
| 8,266,203 B2 | 9/2012 | Xu et al. | |
| 8,266,297 B2 | 9/2012 | Li et al. | |
| 8,407,299 B2 * | 3/2013 | Bakker | H04L 65/1016 709/206 |
| 2002/0097852 A1 | 7/2002 | Huyghe et al. | |
| 2002/0111840 A1 | 8/2002 | Bagdonas | |
| 2002/0111989 A1 | 8/2002 | Ambler et al. | |
| 2002/0126701 A1 * | 9/2002 | Requena | H04L 12/581 370/469 |
| 2002/0181424 A1 | 12/2002 | Shaheen et al. | |
| 2003/0033334 A1 | 2/2003 | Banerjee et al. | |
| 2003/0188010 A1 | 10/2003 | Raza et al. | |
| 2004/0087299 A1 | 5/2004 | Vallinen et al. | |
| 2004/0103157 A1 | 5/2004 | Requena et al. | |
| 2004/0196867 A1 | 10/2004 | Ejzak et al. | |
| 2004/0199638 A1 | 10/2004 | Kaler | |
| 2004/0203680 A1 | 10/2004 | Sylvain | |
| 2005/0066038 A1 | 3/2005 | Sakamoto et al. | |
| 2005/0108332 A1 | 5/2005 | Vascillo | |
| 2005/0207415 A1 | 9/2005 | Curcio et al. | |
| 2005/0213716 A1 * | 9/2005 | Zhu | H04L 29/06027 379/45 |
| 2006/0045067 A1 * | 3/2006 | Dezonno | H04L 12/2602 370/352 |
| 2006/0075042 A1 | 4/2006 | Wang et al. | |
| 2006/0174009 A1 | 8/2006 | Martiquet et al. | |
| 2006/0223510 A1 | 10/2006 | Takeda et al. | |
| 2006/0229093 A1 | 10/2006 | Bhutiani et al. | |
| 2006/0229095 A1 | 10/2006 | Sung et al. | |
| 2006/0294243 A1 | 12/2006 | Kuure et al. | |
| 2007/0043872 A1 | 2/2007 | Patlan et al. | |
| 2007/0078986 A1 | 4/2007 | Ethier et al. | |
| 2007/0094691 A1 * | 4/2007 | Gazdzinski | H04N 7/17318 725/62 |
| 2007/0100981 A1 * | 5/2007 | Adamczyk | H04L 69/18 709/223 |
| 2007/0239737 A1 * | 10/2007 | Dudley | H04L 12/5875 |
| 2007/0259651 A1 * | 11/2007 | Bae | H04L 29/06027 455/412.1 |
| 2007/0280447 A1 | 12/2007 | Cai et al. | |
| 2008/0002662 A1 | 1/2008 | Grayson et al. | |
| 2008/0043726 A1 * | 2/2008 | Herrero-Veron | H04W 8/18 370/352 |
| 2008/0056151 A1 | 3/2008 | Gazier | |
| 2008/0086525 A1 | 4/2008 | Angwin | |
| 2008/0115125 A1 | 5/2008 | Stafford et al. | |
| 2008/0123686 A1 | 5/2008 | Lee et al. | |
| 2008/0155024 A1 | 6/2008 | Morris | |
| 2008/0162637 A1 * | 7/2008 | Adamczyk | H04L 12/5815 709/204 |
| 2008/0240400 A1 | 10/2008 | Mairs et al. | |
| 2008/0261557 A1 * | 10/2008 | Sim | H04W 4/001 455/404.2 |
| 2008/0267171 A1 | 10/2008 | Buckley et al. | |
| 2008/0268824 A1 | 10/2008 | Allen et al. | |
| 2008/0320083 A1 | 12/2008 | Albertsson et al. | |
| 2009/0004999 A1 * | 1/2009 | Zhu | H04L 29/06027 455/404.2 |
| 2009/0011780 A1 * | 1/2009 | Salinas | H04L 51/38 455/466 |
| 2009/0047922 A1 | 2/2009 | Buckley et al. | |
| 2009/0049087 A1 | 2/2009 | Cackowski et al. | |
| 2009/0067417 A1 * | 3/2009 | Kalavade | H04L 12/66 370/356 |
| 2009/0070469 A1 | 3/2009 | Roach et al. | |
| 2009/0075584 A1 | 3/2009 | Jung et al. | |
| 2009/0093250 A1 * | 4/2009 | Jackson | H04L 1/22 455/435.1 |
| 2009/0094644 A1 | 4/2009 | Jung et al. | |
| 2009/0116467 A1 | 5/2009 | Shi et al. | |
| 2009/0119281 A1 | 5/2009 | Wang | |
| 2009/0119316 A1 | 5/2009 | Bakker | |
| 2009/0119380 A1 | 5/2009 | Bakker | |
| 2009/0119381 A1 | 5/2009 | Bakker | |
| 2009/0119382 A1 | 5/2009 | Bakker | |
| 2009/0119389 A1 | 5/2009 | Mu et al. | |
| 2009/0129396 A1 | 5/2009 | Bakker | |
| 2009/0190577 A1 | 7/2009 | Allen et al. | |
| 2009/0222525 A1 | 9/2009 | Patlan | |
| 2009/0238168 A1 | 9/2009 | Lavoie et al. | |
| 2009/0280770 A1 | 11/2009 | Mahendran | |
| 2009/0296688 A1 | 12/2009 | Bakker et al. | |
| 2009/0296689 A1 | 12/2009 | Bakker et al. | |
| 2009/0298458 A1 | 12/2009 | Bakker et al. | |
| 2009/0316690 A1 | 12/2009 | Kim et al. | |
| 2009/0323636 A1 * | 12/2009 | Dillon | H04L 29/12188 370/331 |
| 2010/0004950 A1 | 1/2010 | Bajko et al. | |
| 2010/0103927 A1 | 4/2010 | Bakker | |
| 2010/0238839 A1 | 9/2010 | Batteram et al. | |
| 2010/0293253 A1 | 11/2010 | Kaida | |
| 2013/0219017 A1 | 8/2013 | Bakker et al. | |

OTHER PUBLICATIONS

Berners-Lee et al.; "Hypertext Transfer Protocol—HTTP/1.0"; HTTP Working Group; Mar. 8, 1995; 57 pages.
Vaudreuil et al.; "VPIM Voice Message MIME Sub-type Registration"; Network Working Group; Sep. 1998; 7 pages.
Zimmerer et al.; "MIME media types for ISUP and QSIG Objects"; Network Working Group; Dec. 2001; 11 pages.
Rosenberg; "A Session Initiation Protocol (SIP) Event Package for Registrations"; Network Working Group; Mar. 2004; 26 pages.
Hilt et al.; "Media Type Extension Negotiation in the Session Initiation Protocol (SIP) Accept Header Field draft-hill-sip-ext-neg-OD"; Session Initiation Protocol Working Group; Jan. 19, 2005; 8 pages.
Rosenberg et al.; "An INVITE-Initialed Dialog Event Package for the Session Initiation Protocol (SIP)"; Network Working Group; Nov. 2005; 39 pages.

(56) References Cited

OTHER PUBLICATIONS

Rosenberg et al.; "A Session Initiation Protocol (SIP) Event Package for Conference State"; Network Working Group; Aug. 2006; 48 pages.
Change Request; 24.229 CR 2168; Rev 6; Version 8.3.0; Apr. 7-11, 2008; 10 pages.
Rosenberg et al; "SIP: Session Initiation Protocol"; XP-002323877; Jun. 2002; 269 pages.
"Telecommunications and Internet Converged Services and Protocols for Advanced Networking (TISPAN); IP Multimedia Call Control Protocol based on Session Initiation Protocol (SIP) and Session Description Protocol (SOP) Stage 3"; ETSI ES 283 003 V1 .7.0; May 2007; 96 pages.
Telecommunications and Internet Converged Services and Protocols for Advanced Networking (TISPAN); SIP Transfer of Charging Information; Draft TS 183 058 V0.0.6; Sep. 2007; 46 pages.
Change Request; 24.229 CR 2136; Rev 1; Version 8.1.0; Nov. 5-9, 2007; 13 pages.
Gonzalez, Jeff, "15 Seconds: Building an XML and XSD Schema Validation Tool," Jupitermedia Corp, Oct. 22, 2002, 6 pgs.
EPO, Extended Search Report, Application No. 12150976.4, Apr. 26, 2012, 4 pgs.
PCT Notification of Transmittal of the International Search Report and the Written Opinion of the International Searching Authority; Application No. PCT/US2008/078138; Jan. 5, 2009; 12 pages.
PCT Notification of Transmittal of the International Search Report and the Written Opinion of the International Searching Authority; Application No. PCT/US2008/078146; Jan. 12, 2009; 12 pages.
PCT Notification of Transmittal of the International Search Report and the Written Opinion of the International Searching Authority; Application No. PCT/US2008/078151; Jan. 5, 2009; 13 pages.
PCT International Search Report and Written Opinion in Application No. PCT/US2008/080769; International Searching Authority; Mar. 2, 2009; 13 pages.
PCT International Search Report and Written Opinion in Application No. PCT/US2008/083937; International Searching Authority; Apr. 24, 2009; 15 pages.
PCT International Preliminary Report of Patentability; App No. PCT/US2008/078138; dated Jan. 19, 2010; 11 pgs.
PCT International Preliminary Report of Patentability; App No. PCT/US2008/078146; dated Jan. 19, 2010; 6 pgs.
PCT International Preliminary Report of Patentability; App No. PCT/US2008/078151; dated Jan. 19, 2010; 5 pgs.
PCT International Preliminary Report of Patentability; App No. PCT/2008/080769; dated Jul. 10, 2009; 12 pgs.
PCT International Preliminary Report of Patentability; App No. PCT/US2008/083937; dated Jun. 3, 2010; 12 pgs.

\* cited by examiner

CONTENT DISPOSITION SYSTEM AND METHOD FOR PROCESSING MESSAGE CONTENT IN A DISTRIBUTED ENVIRONMENT

PRIORITY CLAIM UNDER 35 U.S.C. §120 & 37 C.F.R. §1.78

This nonprovisional patent application is a continuation application claiming the benefit of the following prior United States patent application entitled: "CONTENT DISPOSITION SYSTEM AND METHOD FOR PROCESSING MESSAGE CONTENT IN A DISTRIBUTED ENVIRONMENT", application Ser. No.: 13/846,208, filed on Mar. 18, 2013, issued as U.S. Pat. No. 9,178,932 on Nov. 3, 2015, which is a continuation application claiming the benefit of the following prior United States patent application entitled: "CONTENT DISPOSITION SYSTEM AND METHOD FOR PROCESSING MESSAGE CONTENT IN A DISTRIBUTED ENVIRONMENT", application Ser. No.: 12/256,169, filed on Oct. 22, 2008, issued as U.S. Pat. No. 8,407,299 on Mar. 26, 2013, which claims priority based upon the following prior U.S. provisional patent application(s): (i) "SYSTEM AND METHODS FOR HANDLING SIP BODIES," Application No.: 60/983,174, filed Oct. 27, 2007, in the name(s) of Jan John-Luc Bakker, Adrian Buckley and Andrew Allen; and (ii) "SIP CONTENT DISPOSITION HEARDER SYSTEM AND METHOD," Application Ser. No.: 61/015,003, filed Dec. 19, 2007, in the name(s) of Jan John-Luc Bakker, Adrian Buckley and Andrew Allen; each of which foregoing applications is hereby incorporated by reference.

REFERENCE TO RELATED APPLICATION(S)

This application discloses subject matter that is related to the subject matter of the following U.S. patent application(s): (i) "SYSTEM AND METHOD FOR EFFECTUATING AN EMERGENCY SERVICES (ES) CALL IN A NETWORK ENVIRONMENT INCLUDING IMS", application Ser. No. 12/240,321, filed on Sep. 29, 2008, in the name(s) of Jan John-Luc Bakker, Andrew Allen and Adrian Buckley; (ii) "SCHEMA NEGOTIATION FOR VERSIONED DOCUMENTS TRANSMITTED IN A DISTRIBUTED ENVIRONMENT", application Ser. No. 12/240,286, filed on Sep. 29, 2008, in the name(s) of Jan John-Luc Bakker, Andrew Allen and Adrian Buckley; and (iii) "SYSTEM AND METHOD OF RESPONDING TO A REQUEST IN A NETWORK ENVIRONMENT INCLUDING IMS", application Ser. No. 12/240,381, filed on Sep. 29, 2008, in the name(s) of Jan John-Luc Bakker, Andrew Allen and Adrian Buckley; each of which foregoing applications is hereby incorporated by reference.

FIELD OF THE DISCLOSURE

The present patent disclosure generally relates to message processing in communications networks. More particularly, and not by way of any limitation, the present patent disclosure is directed to a content disposition system and method for processing message bodies in a distributed environment, e.g., a network environment including an Internet Protocol (IP) Multimedia Subsystem (IMS) network.

BACKGROUND

Markup languages are being used in describing information relating to messages implemented in communication protocols. In a network environment where different entities communicate with each other using message bodies in Markup languages that are extensible, it becomes important that the languages as well as any meta-structures used for understanding the language are compatible across the environment. Otherwise, significant interoperability issues leading to failure in communication, unpredictable behavior, etc., for example, may arise.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
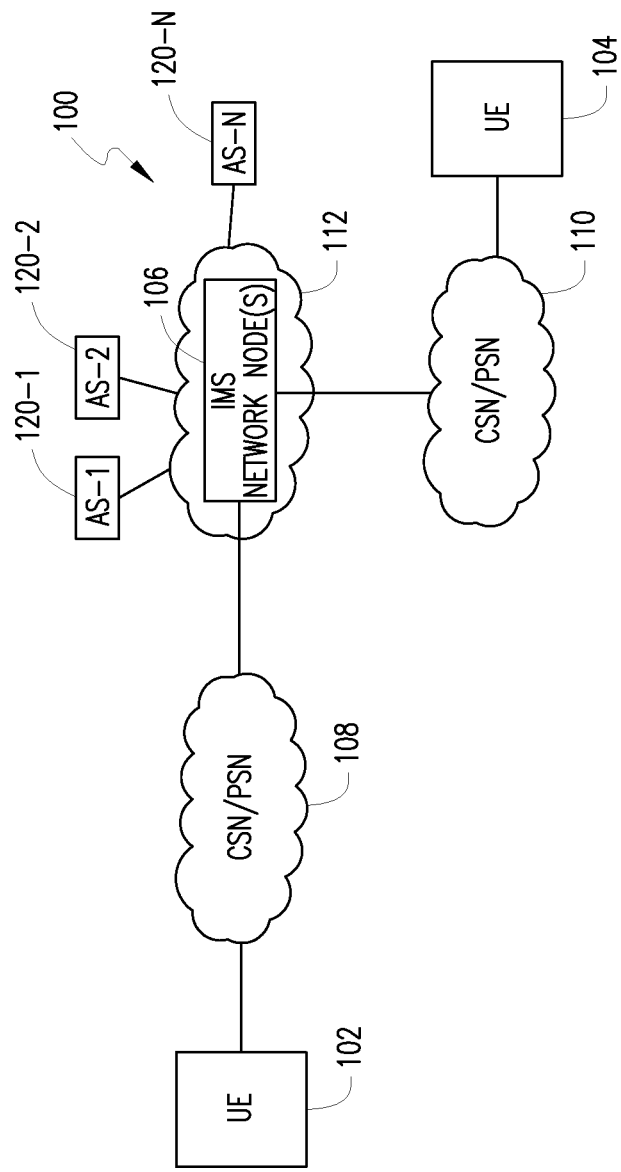
FIG. 1 depicts an exemplary distributed network environment wherein one or more embodiments of the present patent disclosure may be practiced.

The present patent disclosure is broadly directed to a content disposition system and method for processing message content in a distributed environment, wherein the message content may be provided in one or more versioned message bodies or body parts of a communication protocol. In the context of the present patent application, a "message" or "message body" may refer to one or more message bodies, which in turn can be equivalent to one or more body parts. In one aspect, an embodiment is directed to a method of interpreting contents of at least one message body per message, wherein the contents correspond to a content type. The claimed embodiment comprises one or more of the following and is not necessarily limited thereto: receiving a message from a sender by a recipient, the message including at least one message body content in the message's body; examining whether at least one indicator is associated with the message; and responsive to the examination, inhibiting a treatment of the at least one message body content in the message's body and applying an alternative treatment with respect to the at least one message body content in the message's body.

In another embodiment of the present patent disclosure, an apparatus is disclosed for interpreting contents of at least one message body per message, wherein the contents correspond to a content type. The claimed embodiment comprises one or more of the following and is not necessarily limited to: a component associated with a recipient configured to receive a message from a sender, the message including at least one message body content in the message's body; a component configured to examine whether at least one indicator is associated with the message; and a component, operable responsive to the examination, configured to inhibit a treatment of the at least one message body content in the message's body and for applying an alternative treatment with respect to the at least one message body content in the message's body.

In certain other aspects, the present patent disclosure also discloses the following additional embodiments. A method is provided for processing message bodies of a communication protocol, wherein the message bodies can exist in one or more versions. The claimed embodiment comprises one or more of the following features and is not necessarily limited to: receiving a communication protocol message from a sender by a recipient, the communication protocol message including a message body; examining an indicator (e.g., a content disposition indicator or a content type indicator) associated with the communication protocol message (i.e., whether an indicator is present, and if so, the value or values it may have, etc.); and responsive to the examination, inhibiting rendering of the message body and invoking an alternative treatment with respect to the message body's contents. In another embodiment, a method is disclosed for facilitating processing of message bodies of a communication protocol, wherein the message bodies can exist in one or more versions. The claimed embodiment comprises one or more of the following features and is not necessarily limited to: generating a communication protocol message by a sender towards a recipient, the communication protocol message including a message body; and providing an indicator in the communication protocol message to indicate to the recipient a process treatment with respect to the message body's contents. In a still further embodiment, an apparatus is disclosed for facilitating processing of message bodies of a communication protocol, wherein the message bodies can exist in one or more versions. The claimed apparatus comprises one or more of the following features and not necessarily limited to: a component associated with a sender configured to generate a communication protocol message towards a recipient, the communication protocol message including a message body; and a component associated with the sender configured to provide a content disposition indicator in the communication protocol message to indicate to the recipient a process treatment with respect to the message body's contents. In one or more embodiments set forth above, the content disposition indicator is operable in one implementation to identify a process treatment that involves interpretation and/or execution of a set of directives provided in the communication protocol message. In another implementation, the content disposition indicator is operable to identify a process treatment that involves interpretation and/or execution of a script provided in the communication protocol message. In additional implementations, the content disposition indicator is operable to identify a standards body specification, a function, and/or an application for processing the message body's contents, wherein the content disposition indicator may be provided in a header field or a body of the communication protocol message.

The term "document" in the present patent disclosure can mean one of the following depending on its context: a document can be the body of a SIP message (which can be a request or a response), or it can be a body part of a SIP message (request or response) (in the event the body contains multiple parts), or it can be an XML schema document, or it can be a XML instance document (typically an instance of one or more XML schema document(s)). The term "schema version indicator" can indicate the following: (i) none or one or more sets of documents supported by a recipient or none or one or more sets of documents within which the transmitted document is an element; or (ii) none or one or more schemas supported by a recipient or none or one or more schemas by which the transmitted document can be validated; or (iii) a combination of the above.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary distributed environment 100 is depicted wherein one or more embodiments of the present patent disclosure may be practiced for managing schema version negotiation with respect to message bodies. At the outset, it should be realized that although the distributed environment 100 is exemplified as a telecommunications network, the embodiments of the present disclosure are not necessarily limited thereto and one or more aspects of the embodiments may be practiced in other distributed multi-node environments wherein entities or nodes communicate with one another in suitable communication protocols having versioned message bodies and message body types.

As depicted, the network environment 100 includes multiple entities or nodes, i.e., endpoints as well as entities intermediate therebetween, for purposes of effectuating various telecommunications services. Exemplary endpoints comprise User Equipment (UE) devices 102, 104 that are coupled to a core network infrastructure 112 by means of suitable access networks 108, 110, respectively. Access networks 108, 110 may collectively be deemed as an access space comprised of a number of access technologies available to UE devices 102, 104. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. In one embodiment, a UE device may be capable of operating in multiple modes in that it can engage in both Circuit-Switched (CS) as well as Packet-Switched (PS) communications, and can transition from one mode of communications to another mode of communications without loss of continuity. Furthermore, those skilled in the art will recognize that a wireless UE device may sometimes be treated as a combination of a separate mobile equipment (ME) device and an associated removable memory module. Accordingly, for purposes of the present disclosure, the terms "wireless device" and "UE device", which are broadly synonymous, are each treated as representative of both ME devices alone as well as the combinations of ME devices with removable memory modules as applicable.

The access space comprising the access networks 108, 110 may include CS networks, PS networks, or both, which may involve wireless technologies, wireline technologies, broadband access technologies, etc. For example, wireless technologies may include Global System for Mobile Communications (GSM) networks and Code Division Multiple Access (CDMA) networks, as well as any $3^{rd}$ Generation Partnership Project (3GPP)-compliant cellular network (e.g., 3GPP or 3GPP2). Broadband access networks may include wireless local area networks or WLANs, Wi-MAX networks as well as fixed networks such as Digital Subscriber Line (DSL), cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution-Data Optimized (EVDO) technology, and their successors such as Long Term Evolution (LTE), and so on. Additionally, the access networks 108, 110 may also include the conventional wireline PSTN infrastructure in some implementations.

The network infrastructure 112 may comprise an IP Multimedia Subsystem (IMS) core layer as well as a services/applications layer. As is well known, the IMS core is defined by the standards set forth by the 3GPP body that are designed to allow service providers manage a variety of services to be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), PTT-over-Cellular (PoC), or other IMS Centralized Services (ICS) service, etc. IMS manages applications by defining common control components that each application server (AS), e.g., AS-1 120-1 through AS-N 120-N, is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body that mainly addresses GSM networks, another group, 3GPP2, is involved in defining a closely analogous architecture referred to as Multimedia Domain (MMD). MMD is basically an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 1, reference numeral 106 refers to one or more network nodes that comprise the core infrastructure. By way of illustration, network node 106 may exemplify Proxy-Call Session Control Function (P-CSCF) nodes, Serving-CSCF or S-CSCF nodes, Interrogating-CSCF or I-CSCF nodes, Breakout Gateway Control Function (BGCF) nodes, Interconnection Border Control Function (IBCF) nodes, Media Gateway Control Function (MGCF) nodes, Home Subscriber Server (HSS) nodes, and the like. As alluded to previously, these nodes as well as the endpoint UE devices employ SIP as a communication protocol for session control, i.e., setting up and tearing down communication sessions. Accordingly, the network nodes and the UE devices may collectively be referred to as "SIP entities", or more generally, "communication protocol entities", that engage in sending and receiving suitable communication protocol messages (e.g., SIP messages) for effectuating various services, e.g., VCC, PTT, PoC, Emergency Services, etc.

Each SIP entity is typically provided with a User Agent (UA) that may operate in two fashions: (i) User Agent Client (UAC) that generates request messages towards servers; and (ii) User Agent Server (UAS) that receives request messages, processes them and generates suitable responses. In some application scenarios, a single UA may function as both at a SIP entity, e.g., a UE device or a network node. In the most basic form, SIP uses six types (methods) of requests:

INVITE: Indicates a user or service is being invited to participate in a call session.
ACK: Confirms that the client has received a final response to an INVITE request.
BYE: Terminates a call/session and can be sent by either the caller or the callee.
CANCEL: Cancels any pending searches but does not terminate a call/session that currently in progress.
OPTIONS: Queries the capabilities of servers.
REGISTER: Registers the address listed in the To: header field with a SIP server.

Figure 5A:
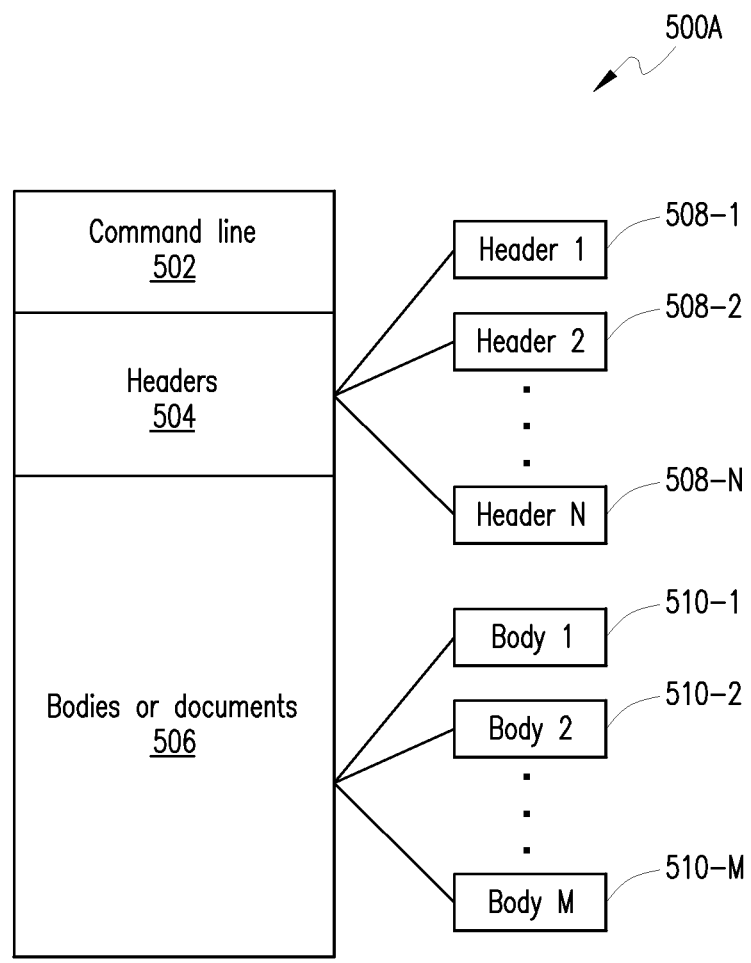
FIG. 5A depicts the structure of an exemplary communication protocol message (e.g., a Session Initiation Protocol (SIP) message) having one initial line, one or more header fields, and a message body, where the message body possibly includes multiple body parts.

As SIP can continue to evolve, a recipient may receive a method of request that it does not recognize. Such a method of request is handled as the UNKNOWN method of request. In response to requests, SIP uses the following categories of responses:

1xx Informational Messages
2xx Successful Responses
3xx Redirection Responses
4xx Request Failure Responses
5xx Server Failure Responses
6xx General Failure Responses SIP messages are typically provided with a standardized message structure. FIG. 5A depicts the structure of an exemplary communication protocol message (e.g., a Session Initiation Protocol (SIP) message) having one initial line, one or more header fields, and a message body, where the message body possibly includes multiple body parts. A command line portion 502 identifies the initial line (e.g., a request line in requests and a status line in responses). A header portion 504 identifies one or more header fields 508-1 through 508-N that convey various pieces of information. One or more message bodies 510-1 through 510-M may be provided in a message body portion 506. As is well known, a message body is operable to hold any content such as plain text, coded images, or any information that may be rendered, e.g., in a Markup Language such as XML, HTML, etc. Each message body (or body part) is described using header fields such as, but not limited to, Content-Disposition, Content-Encoding, and Content-Type, etc., which provide information on its contents. Typically, the value of a Content-Type header field is a Multi-purpose Internet Mail Extensions (MIME) type. Furthermore, where a Markup Language is used for describing the message contents, such a message body may also be referred to as a document. Such a document conforms to a schema document. Each schema can produce one or more document instances or documents or instances. Due to the extensibility of the Markup Language, if the schema document evolves, it is possible that the schema can produce additional or even a different set of document instances. The sets with instance documents produced by the various (evolved) schema documents can be identified with tokens. In one embodiment, the set with instance documents may be identified with the same token as the token identifying the evolved schema document. In another embodiment, this token can be a digit, a decimal, a URN namespace, or a string of characters. In yet another embodiment, the set with schema documents may be identified with a token. In a still further embodiment, the set with instance documents may be identified with a token.

SIP-based applications, including the session control applications for communications services implemented in a communications network such as the network 100 shown in FIG. 1, increasingly rely on XML documents to exchange data and/or other information. In general, various SIP entities may communicate with each other using XML documents as a common data interchange language for effectuating communication sessions, Business-to-Business (B2B) and Business-to-Consumer (B2C) applications, etc. Additionally, technologies such as web servers, servlets, web applications, web services, and the like also generally rely in some fashion on data organized according to the XML Specification.

XML is a subset of a family of Standardized General Markup Languages (SGML) and is standardized by the W3 Consortium. As such, XML is a hierarchical set of entities wherein an entity may contain one or more elements. Each element comprises an opening label or tag, text, and a closing label or tag. Typically, elements also contain one or more attributes that operate to modify information contained in the elements. As a descriptive language to describe information or data passed between nodes, XML is provided with certain syntax rules such as, e.g., (i) XML documents must have a root element; (ii) XML elements must have a closing tag; (iii) XML tags are case sensitive; (iv) XML elements must be properly nested and/or ordered; (v) XML attribute values must be quoted, and so on. An XML file with correct syntax is called a "well formed" XML file. Because of extensibility (which allows any author to define their own application-specific elements, attributes, etc.), an XML document may exist in multiple variations, yet a recipient may still only be configured to use a subset of elements and attributes present in the various possible variations. To facilitate document compatibility between multiple nodes, certain meta-level structure or "schema" that is relevant to a particular document type is implemented at the transacting nodes. The various meta-level structures or "schemas" defining the sets of possible XML instance documents can be indicated. This indicator can be used by the sending node of the transacting nodes to identify the sets the XML instance document is a member of. A receiving node of the transacting nodes can use the indicator to identify another component (e.g., part of message body (or body part)-specific layer) that can semantically and/or syntactically handle the received element of set of XML documents it is known to handle.

An XML schema may therefore be thought of as a definition of the structure, organization, and data types that are acceptable in corresponding XML documents. The XML schema further defines a set of XML elements, XML element attributes, and organization among the XML elements that is desired, whereby the XML schema serves as a vocabulary for the XML elements. Furthermore, since the schemas themselves are based on XML, they may also be extended and may exist in multiple versions. Because of extensibility (which allows any author to define their own application-specific elements, attributes, etc.), an XML schema document identified using the same identifier or media type may exist in multiple variations. To facilitate document compatibility between multiple nodes, common/certain meta-level structure or "schema" that is relevant to a particular document type is implemented at the transacting nodes. In some XML implementations, a Document Type Definition (DTD), XML Schema, NGRelax, or a Document Content Definition (DCD) or other XML schema, may be provided to define a set of rules with respect to the meta-structure of an XML file. Another implementation is to provide an XML-based alternative (i.e., an XML schema) to DTDs, for example, XML Schema, NGRelax, or other. The XML Schema language is also sometimes referred to as XML Schema Definition (XSD). A component that applies a XML schema uses it typically for validating an XML document. Accordingly, a "valid" document is a "well formed" document which also conforms to the rules of a XML schema(s) that is/are supported by the transacting nodes.

With respect to SIP messages in an IMS network environment, applicable standards (e.g., 3GPP TS 24.229 "IP multimedia call control protocol based on Session Initiation Protocol (SIP) and Session Description Protocol (SDP)"; Stage 3 (Release 8)) provide that the MIME type associated with an XML message body is "application/3gpp-ims+xml". The standards also provide that a SIP UA or proxy may insert or remove the XML message body or parts thereof as may be required in any SIP message.

Accordingly, XML bodies or documents in SIP messages may exist according to XML schemas with different versions. Typically, the XML schema used (or a compatible version) to generate the body or body part is also needed by the recipient in order to validate the body or body part. Otherwise, as alluded to in the Background section of the present patent disclosure, an invalid XML document may lead to unpredictable behavior or erroneous results with respect to a requested telecommunications service. Furthermore, if a sender's XML message bodies are not accepted by a recipient's validator due to a lack of compatibility (forward or backward), significant interoperability issues can arise in the communications environment.

Figure 2:
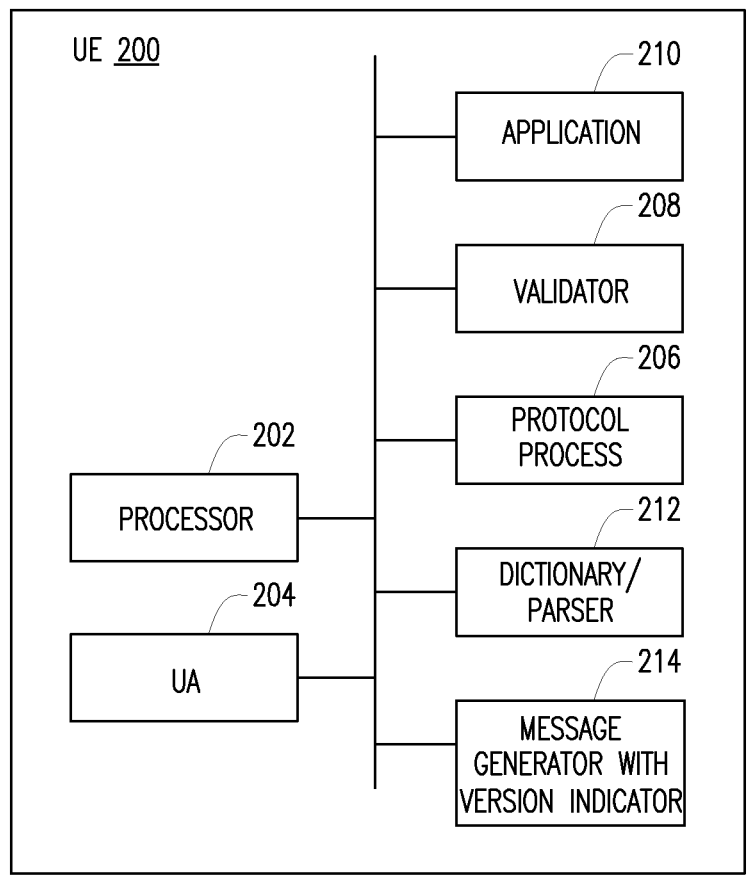
FIG. 2 depicts a block diagram of a User Equipment (UE) device according to an embodiment.

Referring now to FIG. 2, depicted therein is a block diagram of a UE device 200 according to an embodiment that is operable as a SIP entity capable of transacting XML message bodies. One or more processing entities 202 are provided for the overall control of various processes executable on the device. A User Agent 204 is operable either as a UAS or a UAC with respect to a communication protocol process such as a SIP process. Reference numeral 206 refers to an exemplary protocol process module. A validator 208 is operable to validate XML documents, for example, received in a SIP message body. Validator 208 may also be used to generate XML documents of a particular version and possibly include a document version in the document. An application 210 is operable to execute or invoke suitable software based on the contents of the XML message documents. A dictionary and parser 212 may also be provided with respect to message parsing. A message generator 214 operable in conjunction with applicable protocol processes is included that is also capable of providing an indicator such as, e.g., a schema version indicator, in communication protocol messages generated towards another SIP entity as set forth below.

Figure 3:
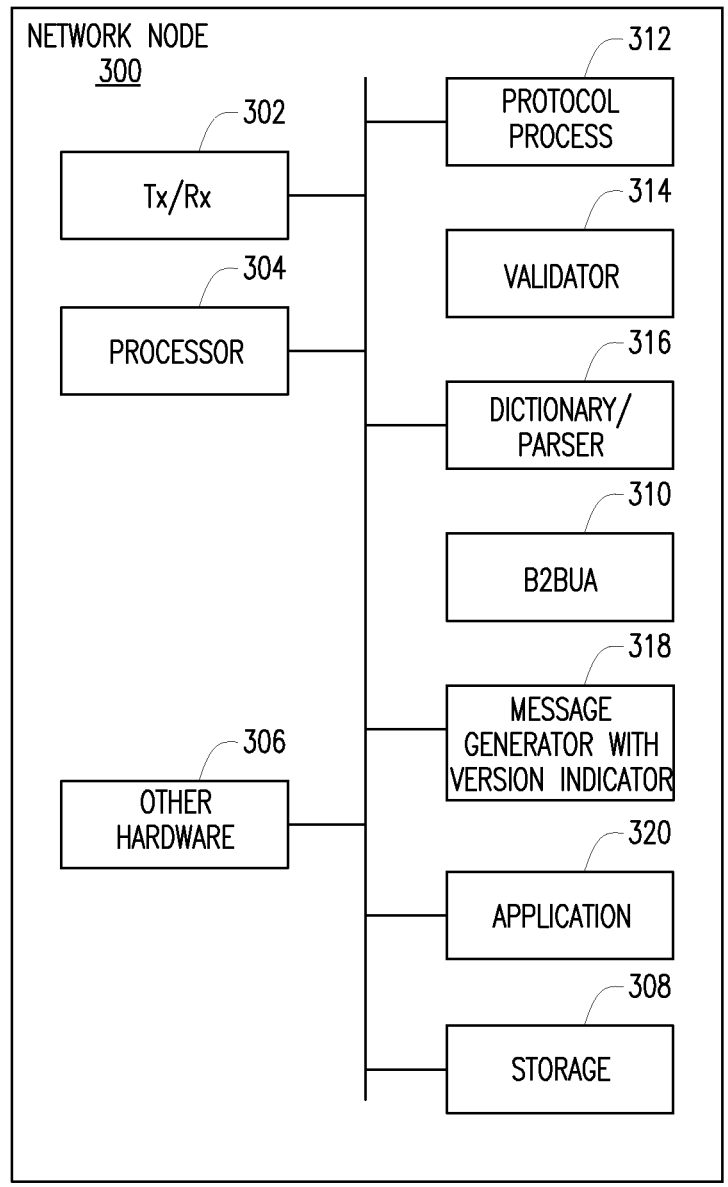
FIG. 3 depicts a block diagram of a network node according to one embodiment.

FIG. 3 depicts a block diagram of a network node 300 according to an embodiment that is operable as a SIP entity capable of transacting XML message bodies. By way of illustration, the embodiment of network node 300 is exemplary of any IMS infrastructure entity referred to hereinabove. One or more processing entities 304 are provided for the overall control of various processes executed by the network node 306 regardless of its architecture or proxy functionality. A suitable transmit/receive (Tx/Rx) block 302 is operable to send or receive various communication protocol messages having XML documents in the message bodies. A Back-to-Back User Agent (B2BUA) 310 is operable as a UAS or UAC with respect to a communication protocol process 312 such as a SIP process. A validator 314 is operable to validate XML documents, for example, received in a SIP message body from a sender or is capable of generating XML documents of one or more versions and possibly include a document version in the document. An application 320 is operable to execute or invoke suitable software based on the contents of the XML message documents. A dictionary and parser 316 may also be provided with respect to message parsing. A message generator 318 operable in conjunction with applicable protocol processes is included that is also capable of providing an indicator (e.g., a schema version indicator) in communication protocol messages generated towards another SIP entity as set forth below. Additional hardware 306 and local storage 308 is provided to facilitate other functions relating to managing and negotiating schema/document version information in message flows, potentially in both upstream and downstream directions of a communication path.

Figure 4:
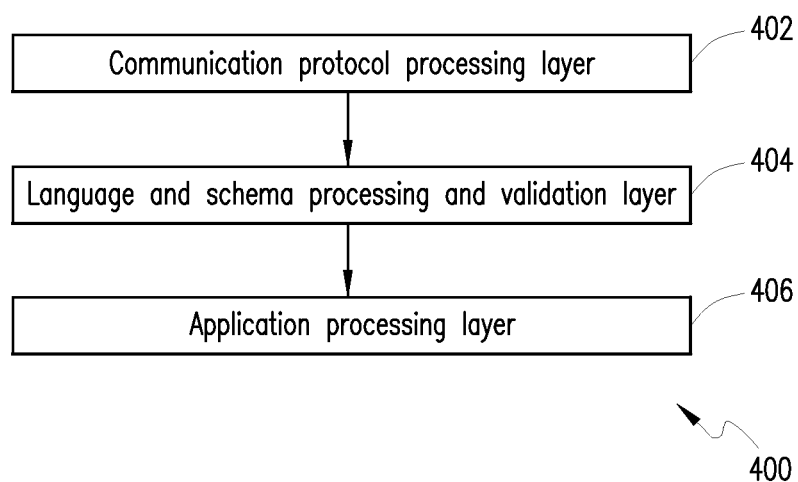
FIG. 4 depicts an embodiment of a software architecture employed at an entity for processing communication protocol messages in an exemplary distributed network environment, wherein the communication protocol messages may include message bodies or documents in multiple versions.

FIG. 4 depicts an embodiment of a software architecture 400 employed at an entity (e.g., UE device 200 or network node 300) for processing communication protocol messages in an exemplary distributed network environment wherein the communication protocol messages may include message documents in multiple versions. Upon receiving a communication protocol message from a sender, a suitable communication protocol layer 402 controls the processing of the received message. After it is determined that the received message is a proper message in accordance with the communication protocol architecture (e.g., validity of the command line, header fields, etc.), a message body (or body part)-specific layer 404 (e.g., based on the value of the Content-Disposition field, the default Content-Disposition for the Content-Type, the default Content-Disposition for the Content-Type when received on the particular entity) is executed. For example, if the message body (or body part)-specific layer is an XML layer considering well-formedness, validation can be executed. If there is an error at this stage, the processing may quit gracefully, with or without alerting, or may take alternative course(s) of action depending on any indications provided in the message itself or prior configuration. An application-specific layer 406 is executed thereafter.

Figure 5B:
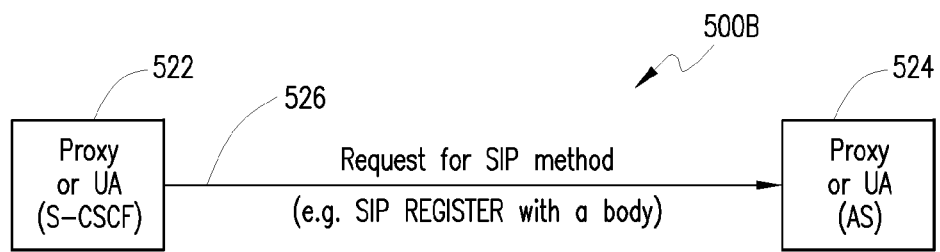
FIGS. 5B and 5C depict exemplary message flows between two entities in a distributed environment wherein communication protocol messages having message bodies are transmitted.
Figure 5C:
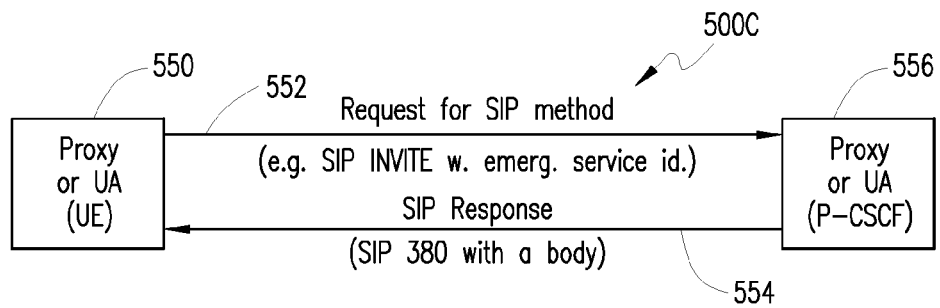

FIGS. 5B and 5C depict exemplary message flows between two entities in a distributed network environment wherein communication protocol messages having versioned message bodies (and/or according to versioned schemas) may be transmitted. In particular, reference numeral 500B in FIG. 5B refers to a message flow between two network nodes such as a Serving CSCF node 522 and an AS node 524 with respect to a particular service. A request for SIP method 526 exemplified by a SIP REGISTER message including a message body that may contain a versioned XML document in accordance with the MIME type "application/3gpp-ims+xml", where the MIME type (representing an XML document) can have a parameter conveying the XML schemas usable to validate the XML document. Reference numeral 500C in FIG. 5C refers to a message flow between an endpoint (e.g., a UE device) 550 and a network node such as a Proxy CSCF node 556. For purposes of the present patent disclosure, a "SIP message" may mean a request message or a response message depending on the context. A SIP INVITE request message is exemplary of a request 552 that includes an Emergency Services identifier to indicate that the UE device 550 intends to initiate an emergency service call over the IMS network. A SIP response 554 from P-CSCF 556 may comprise a SIP 380 (Alternative Service) response including a message body. As can be appreciated by one skilled in the art, in both message flow scenarios, if the recipient of a message receives a message body document part of a set of message bodies or according to a schema that is incompatible with the set of message bodies supported by the recipient or cannot be validated by the recipient's validator (e.g., due to absence of the requisite schema), the service behavior will be compromised, leading to unexpected or erroneous results.

Figure 5D:
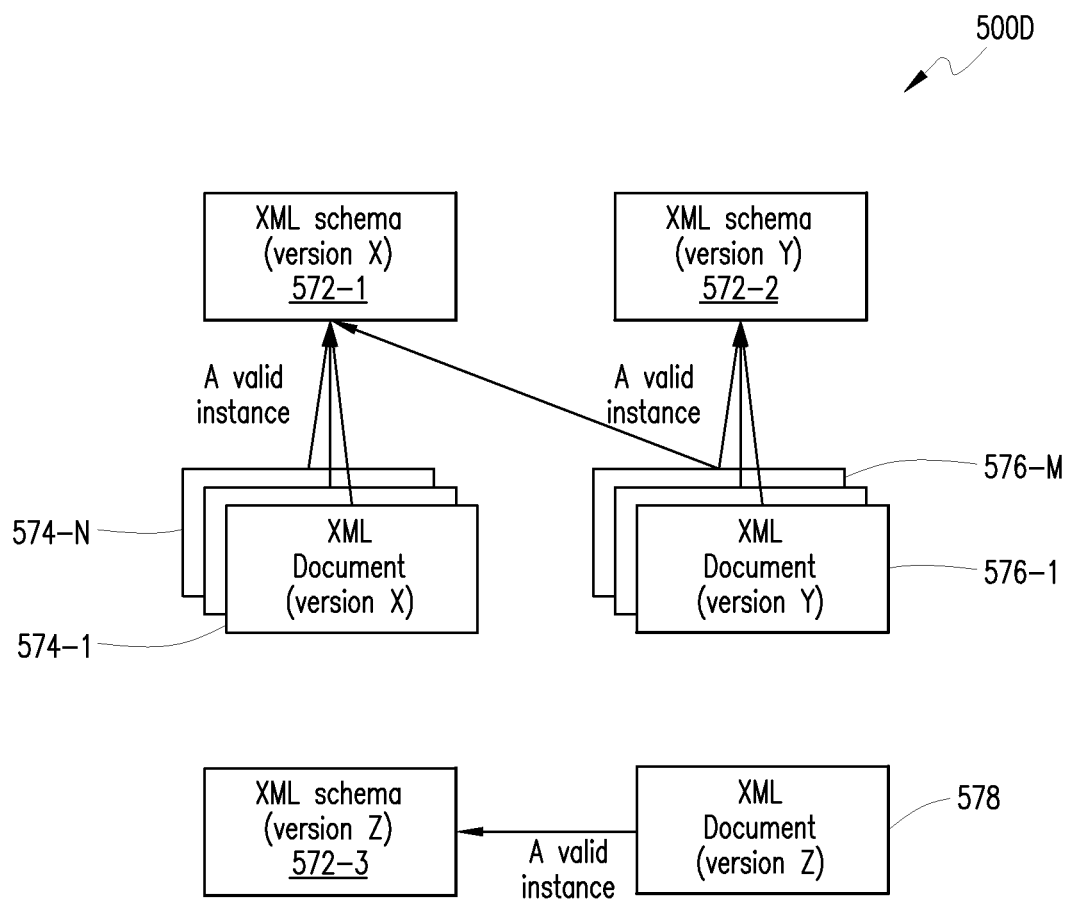
FIG. 5D depicts an exemplary set of different schemas for validating Extensible Markup Language (XML) documents provided as message bodies in communication protocol messages.

FIG. 5D depicts different schemas for validating documents. Reference numerals 572-1 through 572-3 exemplify three documents, where each document is a separate schema of the same type, e.g. MIME or content type: document 572-1 containing a schema of version X; document 572-2 containing a schema of version Y; and document 572-3 containing a schema of version Z. Instance documents, instances (e.g. XML documents) of the documents containing a schema (e.g. XML schema documents), may also indicate the version of the schema document according to the single MIME type that generated it: X, Y, or Z. Each instance document is part of a set with one or more instance documents generated by a single schema document of a particular version. Instance documents, instances (e.g. XML documents) of the documents containing a schema (e.g. XML schema documents), may also indicate the version of the schema document according to the single MIME type that generated it: X, Y, or Z. Each instance document is part of a set with one or more instance documents generated by a single schema document of a particular version. Instance documents including a version indicator "X", i.e., XML document instances 574-1 to 574-N, can minimally be properly validated by the schema document 572-1. Likewise, instances of documents in version Y, i.e., document instances 576-1 to 576-M, can be properly validated by the schema document 572-2. Document of version Z is exemplified as a single instance 578 that may be validated by the schema document 572-3. An instance document including a version indicator "Y" may also be accepted and validated by other schema documents as exemplified by the instance document 576-M and the schema document 572-1.

Figure 6A:
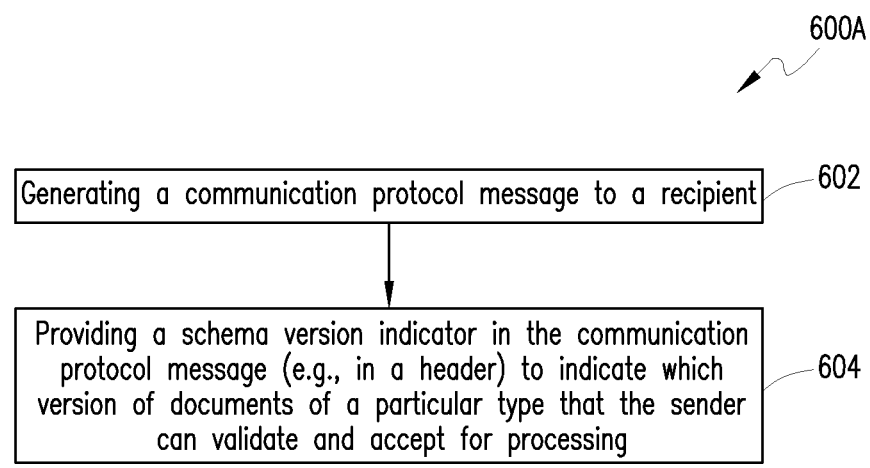
FIG. 6A depicts an embodiment of a method of negotiating schema and document version information relating to message bodies of a communication protocol.

FIG. 6A depicts an embodiment 600A of a method of negotiating schema version information relating to message bodies of a communication protocol. A sender generates a communication protocol message (e.g., a SIP request or a SIP response) towards a recipient (block 602). In one variation, the communication protocol message may include a suitable message body (or body part(s)). The communication protocol message further includes a schema version indicator (e.g., in the Accept header or header field) or otherwise includes sufficient information to indicate which: (i) set of message bodies/body parts of a particular content type, or (ii) documents of a particular content type, the sender can validate and accept for processing (block 604).

In one variation, absence of the schema version indicator may be interpreted by the recipient as indicating that the sender can validate and accept a default set of message body (part) contents or documents of a particular content type. Upon generating an initial INVITE request, a UE device is operable to indicate its support for the 3GPP IMS XML body in the Accept header field by including its MIME type as defined in subclause 7.6.1 of 3GPP TS 24.229. Optionally, a version parameter named 'sv' or 'schemaversion' can be added, indicating the versions of the XML Schema for the IM CN subsystem XML body supported. The syntax for the schemaversion parameter can be found elsewhere in the present document. If the 'sv' or 'schemaversion' parameter is absent, it shall be assumed that the UE supports version 1 of the XML Schema for the IM CN subsystem XML body. If support for the 3GPP IMS XML body in the Accept header field is not indicated, it shall be assumed that the UE supports version 1 of the XML Schema for the IM CN subsystem XML body.

Figure 6B:
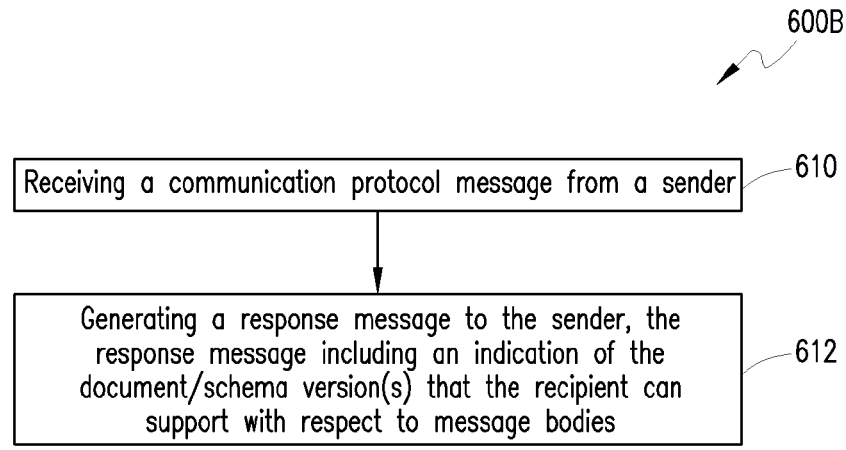
FIG. 6B depicts another embodiment of a method of negotiating schema and document version information relating to message bodies of a communication protocol.

FIG. 6B depicts another embodiment 600B of a method of negotiating schema version information relating to message bodies of a communication protocol. A recipient receives a communication protocol message (e.g., a SIP request or a SIP response message) from a sender (block 610). In one variation, the communication protocol message may include a suitable message body (or body part(s)). Responsive to the received communication protocol message, the recipient generates a response message towards the sender wherein the response message includes a document/schema version indicator, one or more message body (or body part(s)), a type associated with the body part, to indicate which: (i) sets of message body/body part contents of a particular type the body or part is a member of, or (ii) versions of XML schema documents of a particular type that can be used to validate the message body (or body part) (block 612). Furthermore, the indicator can be used by the sender to identify an application layer component that may be used for processing the information.

Figure 6C:
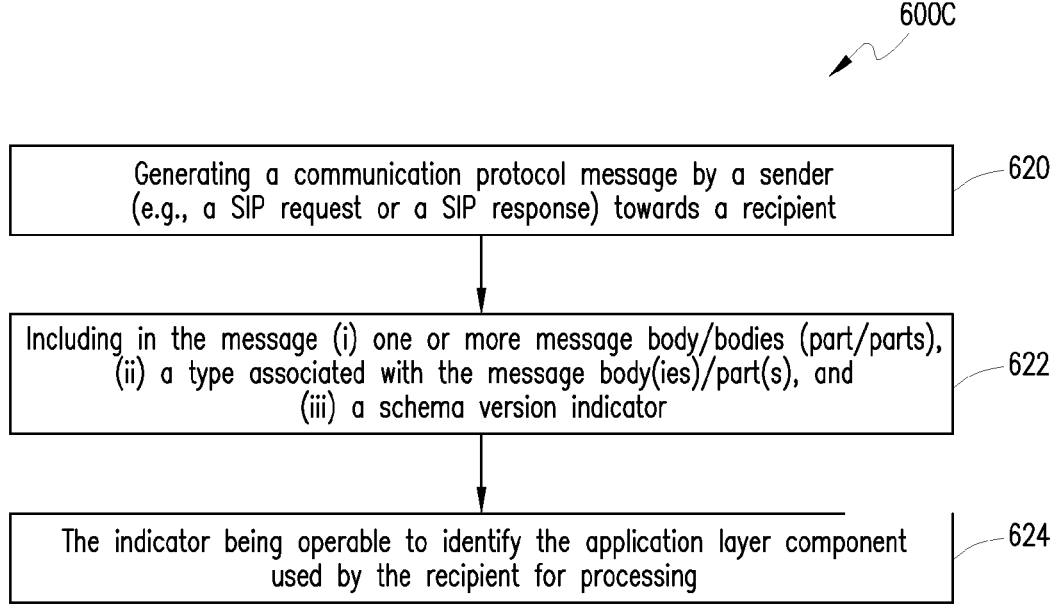
FIG. 6C depicts another embodiment of a method of negotiating schema and document version information relating to message bodies of a communication protocol.

Another embodiment 600C of a method of indicating schema version information relating to message body (or body part(s)) of a communication protocol message is set forth in FIG. 6C. A sender generates a communication protocol message (e.g., a SIP request or SIP response) towards a recipient (block 620). The communication protocol message further includes one or more message body (part(s)), a type associated with the message body, a schema version indicator (e.g. in the Content-Type header field), to indicate which: (i) sets of message body (part) contents of a particular type the boy (part) is a member of, or (ii) versions of XML schema documents of a particular type can be used to validate the message body (part) (block 622). Furthermore, the indicator can be used by the recipient to identify an application layer component that may be used for processing the information.

Figure 6D:
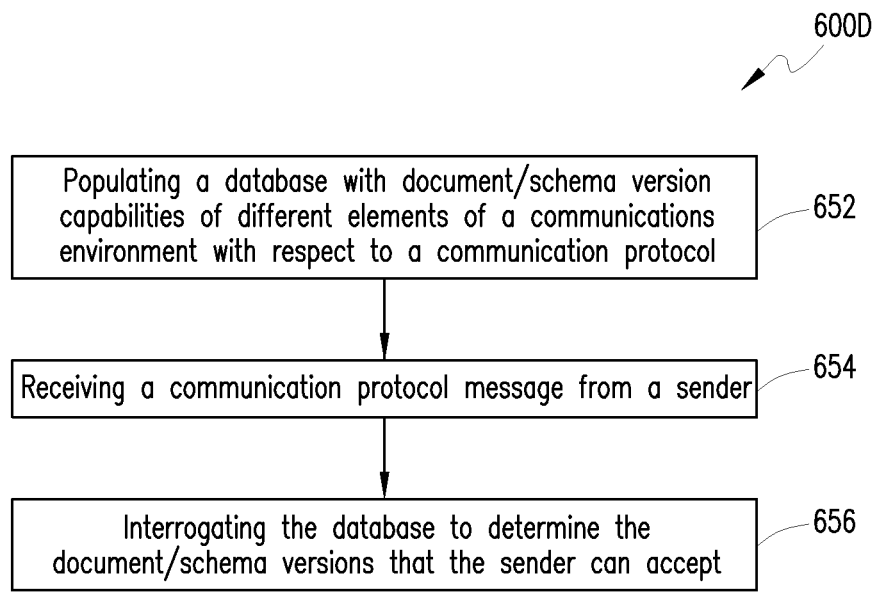
FIG. 6D depicts another embodiment of a method of negotiating schema and document version information relating to message bodies of a communication protocol.

Those skilled in the art will recognize that aspects of the embodiments set forth above can be mixed and implemented in one or more combinations. Furthermore, it should be realized that the negotiation methodologies set forth above are dynamically executed, in the sense that the negotiation process takes place between the entities while a service is being invoked. As another alternative, FIG. 6D depicts an embodiment 600D of a method of negotiating schema version information relating to message bodies of a communication protocol wherein a look-up scheme may be employed. A database is populated with document/schema version capabilities of different elements of a communications environment, potentially in an initial discovery process with respect to a communication protocol (block 652). The database may be distributed, mirrored, localized at the endpoints, or centrally located within a core portion of the communications environment. A recipient receives a communication protocol message (e.g., a SIP message) from a sender (block 654), which may include a suitable message body (or body part). Responsive to the received communication protocol message, the recipient interrogates the database to determine the document versions of a particular type that the sender can accept or validate (block 656). Additionally or alternatively, the recipient may be able to determine based on the interrogation as to the schema version that the sender uses. The sender's ability to convert documents of a particular version to another version that is compatible with one or more downstream nodes may also be interrogated. In a still further variation, a sender may interrogate the database prior to a transaction and determine the schema and/or document capabilities of a recipient. Accordingly, the sender may determine to include only the documents of compatible versions with respect to the recipient. As will be realized by one skilled in the art, the senders and recipients described herein and elsewhere in the patent disclosure may be User Agents operating as UASs or UACs, as appropriate, that are executed on endpoints, network nodes, or both.

Figure 7:
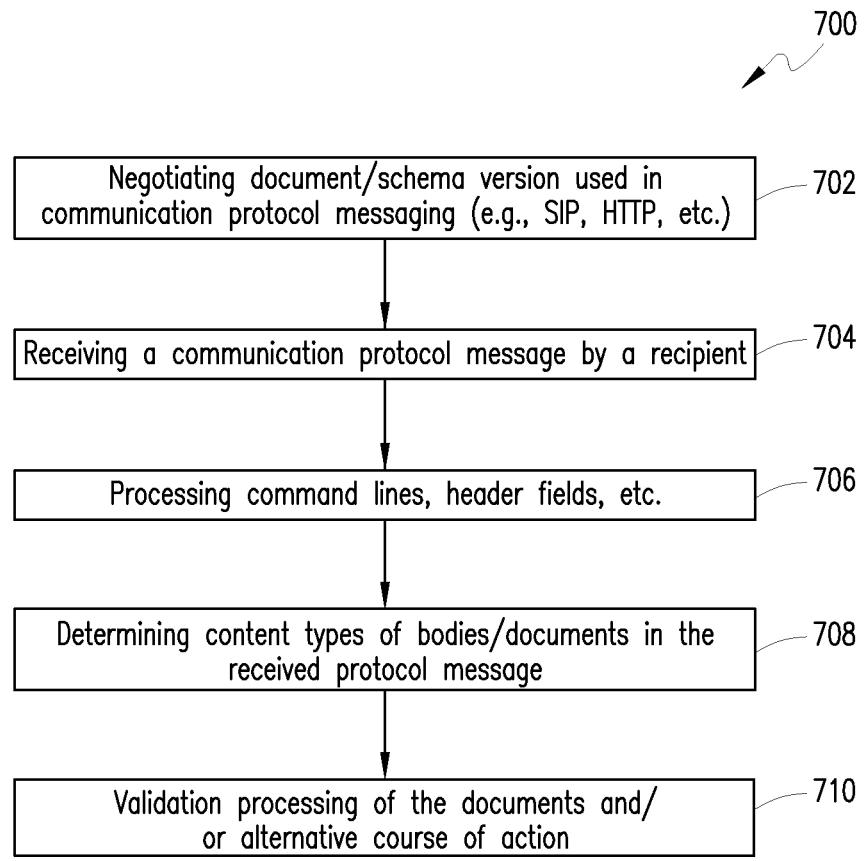
FIG. 7 depicts an embodiment of a method of message processing that involves validation of versioned message bodies (or body parts)

FIG. 7 depicts an embodiment 700 of a method of message processing that involves validation of versioned message bodies. Upon engaging in a negotiation methodology as set forth above with respect to a communication protocol messaging (block 702), a recipient receives a communication protocol message from a sender (block 704). A protocol processor (including, e.g., a message parser) may process the command lines and header fields (block 706), whereupon the content types (optionally including an indicator resolving to the one or more schema versions that can be used to validate the body (part) or document sets in which the body (part) is an element) of various documents received in the protocol message as body or bodies, are determined (block 708). Thereafter, the documents of each type may be validated by an appropriate schema processor/validator instantiated at the recipient or the recipient can otherwise determine whether the received document can be handled. Where an invalid document or a document that cannot be handled is received, a suitable alternative course of action (e.g., a graceful exit) may also be implemented instead of leading to undesirable results such as, e.g., freeze-up of the recipient node. These actions are consolidated as block 710.

Various implementational aspects with respect to the foregoing embodiments are set forth below in detail, especially in particular reference to the SIP-based messaging in 3GPP-compliant IMS network environments. As alluded to previously, applicable 3GPP standards provide for a MIME type, "application/3gpp-ims+xml", that may be associated with one or more set(s) of XML instance documents or corresponding XML schema. As the XML message bodies may be extended to include new elements and/or attributes, or may be changed such that elements and/or attributes are redefined, the various SIP UA entities interacting within an IMS environment may not be compatible with one another. In addition, the UA entities may wish to indicate their support for different 3GPP IMS XML bodies or documents. In one scenario, where an existing XML body is extended to include new elements/attributes, a recipient may still be able to process some of the XML, skipping perhaps over unknown elements and/or attributes (as an example of forward compatibility). The same treatment may also be applied where an existing XML body is changed such that the elements/attributes are redefined. In this scenario, the redefined elements and/or attributes may simply be ignored during validation. Alternatively or additionally, the recipient may be provided with the capability to signal back to the sender that the recipient does not understand the received XML document(s) (e.g., by means of a SIP 415 message (Unacceptable Content-Type) with the supported MIME types and optionally their schema version indicators listed in the SIP Accept header field). Those skilled in the art will recognize that several implementational choices exist with respect to how a SIP UA or proxy that receives such a response signal should treat it, whether the response signal should be stored, and if so, where and for how long, etc.

Forward compatibility among several versions may be achieved by placing certain code or instructions that have the effect of allowing additional elements, attributes, or both without causing the recipient's XML validator to declare the XML document instance invalid. In one embodiment, the following code portion may be inserted:

<xs:any namespace="##any"

processContents="lax"

minOccurs="0"

maxOccurs="unbounded"/>

However, not all XML processors or validators may support randomly placing the "xs:any" line mentioned above. To increase compatibility with XML validators, one exemplary embodiment provides that the "xs:any" line is placed as the last line of the definition of any complexType, group, etc. Accordingly, any new elements in updated XML schema are inserted just above the aforesaid code portion. Forward compatibility can also be achieved by placing "<xs:anyAttribute/>" or similar lines that have the effect of allowing additional attributes without causing the XML validator to declare the XML document instance invalid.

An exemplary construct that is consistent with respect to various applicable schema version compatibility issues is set forth below in Table 1.

TABLE 1

```
<xs:schema xmlns:xs="http://www.w3.org/2001/XMLSchema"
elementFormDefault="qualified"
attributeFormDefault="unqualified" version="1">
    <xs:complexType name="tIMS3GPP">
[..]
    <xs:element name="ims-3gpp" type="tIMS3GPP">
        <xs:attribute name="version"
type="allowedVersionValues" use="required"/>
    </xs:element>
    <xs:simpleType name='allowedVersionValues'>
        <xs:restriction base='xs:decimal'>
            <xs:pattern value='1|1\.[0-9]|1\.[1-9][0-9]'/>
        </xs:restriction>
    </xs:simpleType>
</xs:schema>
```

Another possible realization of an XML schema construct is set forth below in Tables 2A and 2B.

TABLE 2A

```
<?xml version="1.0" encoding="UTF-8"?>
<xs:schema xmlns:xs="http://www.w3.org/2001/XMLSchema"
elementFormDefault="qualified"
attributeFormDefault="unqualified" version="1">
    <xs:complexType name="tIMS3GPP">
        <xs:sequence>
            <xs:choice>
                <xs:element name="alternative-service"
type="tAlternativeService"/>
                <xs:element name="service-info"
type="xs:string"/>
            </xs:choice>
            <xs:any namespace="##any"
processContents="lax" minOccurs="0" maxOccurs="unbounded"/>
        </xs:sequence>
        <xs:attribute name="version"
type="allowedVersionValues" use="required"/>
        <xs:anyAttribute/>
    </xs:complexType>
    <xs:simpleType name='allowedVersionValues'>
        <xs:restriction base='xs:decimal'>
            <xs:pattern value='1|1\.[0-9]|1\.[1-9][0-9]'/>
        </xs:restriction>
```

TABLE 2B

```
    </xs:simpleType>
        </xs:choice>
    </xs:complexType>
    <xs:complexType name="tAlternativeService">
        <xs:sequence>
            <xs:element name="type" type="tType"/>
            <xs:element name="reason" type="xs:string"/>
            <xs:any namespace="##any"
processContents="lax" minOccurs="0" maxOccurs="unbounded"/>
        </xs:sequence>
        <xs:anyAttribute/>
    </xs:complexType>
    <xs:complexType name="tType">
        <xs:sequence>
            <xs:element name="emergency" minOccurs="0"
maxOccurs="1">
                <xs:complexType/>
            </xs:element>
            <xs:any namespace="##any"
processContents="lax" minOccurs="0" maxOccurs="unbounded"/>
        </xs:sequence>
        <xs:anyAttribute/>
    </xs:complexType>
    <xs:element name="ims-3gpp" type="tIMS3GPP"/>
</xs:schema>
```

The root element of the 3GPP IMS XML schema as embodied in Tables 2A and 2B is described as follows: <ims-3gpp>: This is the root element of the 3GPP IMS XML body. It shall always be present. The XML Schema version described in the present document is 1. XML instance documents of future versions of the XML Schema that is defined in Tables 2A and 2B, where the XML Schema version attribute part of the xs:schema element is less than 2 and more than or equal to 1, shall be valid against the XML Schema that is defined in Tables 2A and 2B in this document. XML instance documents of the XML Schema that is defined in Tables 2A and 2B in the present document shall have a version attribute value, part of the ims-3gpp element, that is equal to the value of the XML Schema version described in the present document.

In another representation, an XML schema's version attribute or parameter may be optional, wherein an appropriate default value may be assigned. In both cases, i.e., where the schema's version attribute is set to default and where the schema's version attribute is set to a predefined value that may be coded in a number of ways, the schemaValue in an XML instance document may be provided to match the version attribute of the XML schema from which the document instance is derived.

As alluded to previously, any UA is allowed to add and modify the XML documents. Accordingly, it is advantageous for the UA entities to know acceptable XML schemas and their versions. According to one embodiment, certain indications may be provided to indicate version numbers or a range of version numbers, descriptor technology (such as XML), and root element name. The MIME type may be extended, for example, to include such information: "application/3gpp-ims+xml;sv=1-1.99", where "sv" stands for schema version and the hyphen denotes a range in version values. In addition, a single value may be provided to indicate support for a single schema version and a comma-separated list may be provided to indicate specific schema versions as enumerated and separated by commas. Such a string may be placed in a suitable SIP message header, including but not limited to the Accept header field, Record-Route header field, etc. Other new header fields may also be defined (e.g., P-header) whereby each UA entity may insert its XML document handling capabilities and/or compatibilities. Additionally, where multiple UA entities may be involved in a signaling path, each entity could support different XML schemas. In such a multi-node scenario, a function element (fe) name may also be provided to identify the node (e.g., P-CSCF, S-CSCF, UE, AS, and so on) in multiple Accept headers as set forth in the following example:

"application/3gpp-ims+xml;sv=1-1.99;fe=ue,as,s-cscf".

A general syntax for signaling XML document handling capabilities in a multi-node scenario is as follows:
Functions=<fe name1 token>, <fe name2 token> . . . <fe nameN token>

Additional rules may also be provided depending on implementation. For instance, absence of an IMS functional element (if e) token may mean that the XML schema version and document instance information provided in the header is applicable to any downstream node. Likewise, absence of the sv parameter may mean that any schema version is applied or acceptable. Alternatively, absence of the sv parameter may mean that a default version, e.g., version "1", is applied or is acceptable. It should be apparent that token names other than "sv" or "if e" may also be used as long as all the nodes, e.g., originators or senders, recipients or terminators, and intermediary nodes, are aware of the nomenclature, functionality, syntax and the rules associated therewith. Set forth is an example of an sv token having discrete numbers as well as ranges to indicate supportability of various schema versions:
sv=1-2,10-12,14,16

The foregoing example indicates that schema versions 1 and (inclusive), 10 through 12 (inclusive) are supported as well as versions 14 and 16. Since an XML body document may be included upstream also, it may be that a receiving UA (in a Back-to-Back User Agent or B2BUA configuration) or proxy wishes to use a non-provisional SIP message to indicate its support of certain XML schemas.

Alternatively, in case of not supporting the required version number, the receiving UA may wish to indicate such information in a SIP error message. If the sender receives a non-provisional SIP response, it may follow up with a SIP request such as a CANCEL request, optionally including the reason for such an action.

A further example of an sv token in an Accept header is as follows:
Accept: application/3gpp-ims+xml;sv="1,1.1";ife="ue,p-cscf,s-cscf,as, . . . "

The foregoing example would enable different SIP UA entities involved, if needed, to populate the Accept header (e.g., in an INVITE message) with all their schema versions for the MIME type "application/3gpp-ims+xml". Set forth below are examples of Accept header formats in accordance with known standards (e.g., RFC 2616 and RFC 3261) that may be used for properly encoding the sv and ife tokens.

TABLE 3

| Accept = | "Accept" ":" |
| --- | --- |
| | #( media-range [ accept-params ] ) |
| media-range = | ( "*/*" |
| | | ( type "/" "*" ) |
| | | ( type "/" subtype ) |
| | ) *( ";" parameter ) |
| accept-params = | ";" "q" "=" qvalue *( accept-extension ) |
| accept-extension = | ";" token [ "=" ( token | quoted-string ) ] |

TABLE 4

| Accept = | "Accept" HCOLON |
| --- | --- |
| | [ accept-range *(COMMA accept-range) ] |
| accept-range = | media-range *(SEMI accept-param) |
| media-range = | ( "*/*" |
| | / ( m-type SLASH "*" ) |
| | / ( m-type SLASH m-subtype ) |
| | ) *( SEMI m-parameter ) |
| accept-param = | ("q" EQUAL qvalue) / generic-param |
| qvalue = | ( "0" [ "." 0*3DIGIT ] ) |
| | / ( "1" [ "." 0*3("0") ] ) |
| generic-param = | token [ EQUAL gen-value ] |
| gen-value = | token / host / quoted-string |
| m-parameter = | m-attribute EQUAL m-value |
| m-attribute = | token |
| m-value = | token / quoted-string |

Yet another possible realization of an XML schema construct is set forth below in Table 5. The application/3gpp-ims+xml MIME type, used in the Accept header field according to subclause 5.1.3.1 of 3GPP TS 24.229, is extended to include specific version information needed for IM CN subsystem functional entities. If the parameter is absent, it shall be assumed that the UA originating the SIP method with the Accept header supports version 1 of the XML Schema for the IM CN subsystem XML body. The sv or schemaversion parameter has the syntax described in Table 5. The media-range component has been copied from IETF RFC 3261 for convenience. The sv or schemaversion parameter is an instance of m-parameter from the current media-range component of Accept header, where m-type is application and m-sub-type is 3gpp-ims+xml. If the sv or schemaversion parameter is set to 'none', the UA originating the SIP method indicates it does not find the "application/3gpp-ims+xml" MIME type acceptable. Table 5 shows a possible Syntax of the "sv" or "schemaversion" parameter for the "application/3gpp-ims+xml" MIME type:

TABLE 5

| media-range = | ( "*/*" |
| --- | --- |
| | / ( m-type SLASH "*" ) |
| | / ( m-type SLASH m-subtype ) |
| | ) *( SEMI m-parameter ) |
| schemaVersion = | ( "schemaversion" / "sv" ) "=" "none" / |
| | [schemaversions *(COMMA schemaversions)] |
| schemaversions = | token / ( DIGIT [ "." 0*2DIGIT ] [ "-" |
| | (DIGIT [ "." 0*2DIGIT ] ) ] ) |

As set forth in the foregoing examples, the sv token or parameter can be provided with discrete numerical values that are comma-separated as well as ranges of numbers or digits that have the advantage of being sequential in specifying a schema version. In addition, the sv token may take on values provided as, but not limited to, textual strings, characters, alphanumerical sequences, and the like. Additional information may also be provided in the SIP message header fields to indicate further directives that can be executed at the level of a communication protocol processing layer. By way of illustration, a receiving UA may conclude upon inspecting the Accept header which UA roles or even UAs or functional elements support what types of content. In one implementation, any receiving UA inserting XML content type document instance(s) may be able to insert a directive to direct a downstream element to process one or more XML content type documents. Additional directives may include, but not limited to, the following: "remove after processing", "pass along if don't understand", "must understand" or "ok to remove", and the like. Directives maybe coded as textual strings or binary values, as exemplified below:

| Remove after processing | 00 |
| Pass along if don't understand | 01 |
| Must understand | 10 |
| Ok to remove | 11 |

It must be recognized that the above is just one illustrative example and the ordering of the directives could be any and could be coded as any number of bits.

One suitable information element to include such information may be a URI or MIME parameter, preferably in a textual string representation. In another alternative, such directives may also be encoded within the message body or within a message body part. In another alternative, the information may be represented as an additional body part if multiple body parts are supported, e.g., encoded in some body part with directives referencing other body parts. For instance, the representations may be encoded in XML and for each XML schema that exists per receiving node. In a still further alternative embodiment, the directives per receiving node may be placed per body (or body part) in the Content-Type header field used in the returned SIP messages for identifying the contents. Following is a high-level structure for such a representation:

<<Begin SIP message and header fields
   Including Content-Type header field+optional parameters including zero or more of directives, schemaversions, or other parameters
   if multi-part/*MIME bodies are supported and multiple body parts are included, parameters including zero or more of directives, schemaversions, or other parameters
End SIP message>>

Another alternative encoding for sv values may also be provided using name spaces. By way of illustration, XML schema versioning in a PoC service is set forth in the following example to demonstrate the use of name spaces for signaling the sv information.

Accept: application/poc-settings+xml;
   sv="urn:oma:params:xml:ns:poc:poc-settings, urn:oma:xml:poc:poc2.0-settings"

Basically, the token named "sv" in the above example may be replaced with a token named "ns" to indicate that a list of one or more XML namespace identifiers follows with quotes and separated by commas. Further, a similar approach may also be used for other service-specific UA entities, e.g., UAs with respect to Voice Call Continuity (VCC), IMS Centralized Services (ICS), IMS Session Continuity (ISC), etc.

In addition to conveying SIP level message directives, various attributes may also be transmitted that define a handling capability with respect to the XML documents on a per node basis. That is, the attribute information may be used to indicate allowable behavior for each identified SIP UA or proxy element by way of a policy management mechanism that is executed in association with an XML validator. The following policies are illustrative: (i) ok to ignore, continue with processing message document, drop element; (ii) mandatory to understand, reject message document if don't understand; (iii) mandatory to pass on, no processing is required if not understood; and so on. The behavior policies may be extended to indicate node-specific behavior at each receiving node, e.g., (i) UE requirements; (ii) P-CSCF requirements; (iii) S-CSCF requirements; (iv) Service requirements (e.g., ICS Identifier or ICSI information), and so on.

As set forth above in reference to the embodiment shown in FIG. 6C, an alternative mechanism to signal the schema version and document set version information may involve accessing a database configured with the version support capabilities on per node basis. The database may be accessible to any node in the IMS network. Furthermore, the location of the database may be provided to the nodes via any suitable mechanism (e.g., a mechanism based on RFC 4483). A Uniform Resource Locator (URL) identifying the location of the database may be provided in a message that node can use to access the database. Also, the database could be in a single node or spread across multiple nodes in a distributed database architecture.

An exemplary syntax structure of the sv or schemaversion parameter is provided below in Table 6:

TABLE 6

| m-parameter /= | ("sv" / "schemaversion") EQUAL LDQUOT [ sv-value-list ] RDQUOT |
| sv-value-list = | sv-value-range *( "," sv-value ) |
| sv-value-range = | sv-value [ "-" sv-value ] |
| sv-value = | number / token |
| number = | 1*DIGIT [ "." 1*DIGIT ] |

The sv syntax shown above (in Backus-Naur Format or BNF form) may be used to convey various types of values (digits, strings, etc.) in order to indicate: (i) the versions of the 3GPP IMS XML schema that can be used to validate the 3GPP IMS XML bodies, if the MIME type and parameter are present in the Content-Type header, and (ii) the accepted versions of the 3GPP IMS XML bodies, if the MIME type and parameter are present in the Accept header. As alluded to before, default rules may apply where the sv or schemaversion parameter or when the sv or schemaversion parameter is absent. In one embodiment, if the sv or schemaversion parameter is absent it is to be understood that a certain version or set of versions is supported, e.g. version 1. In another embodiment, if MIME type (e.g. "application/3gpp-ims+xml") is absent and the corresponding sv or schemaversion parameter are absent, it is to be understood that a certain version or set of versions of the MIME type (e.g. "application/3gpp-ims+xml") are acceptable anyway, e.g. version 1. In yet another embodiment, if the sv or schemaversion parameter value is absent it is to be understood that no version or set of versions of the MIME type is supported. The latter feature may be advantageous in cases where even if the corresponding MIME type (e.g. "application/3gpp-ims+xml") is absent, the recipient is to understand that the MIME type and a default value for the version parameter are acceptable regardless. In this case, a sender can use a SIP header field (e.g. the Accept header field) to indicate explicitly that a MIME type and any of its versions are not acceptable.

As one skilled in the art will recognize, the MIME type and its parameters may need to be registered with a suitable registration authority (i.e., a registrar) such as, e.g., the Internet Assigned Numbers Authority or IANA. Set forth below is an exemplary template that can be used for registration purposes:

MIME media type name: application
MIME subtype name: 3gpp-ims+xml
Required parameters: none
Optional parameters: "sv" or "schemaversion"

The foregoing registration entry may include sv syntax shown above in Table 5 in the Augmented BNF (ABNF) form.

Figure 8:
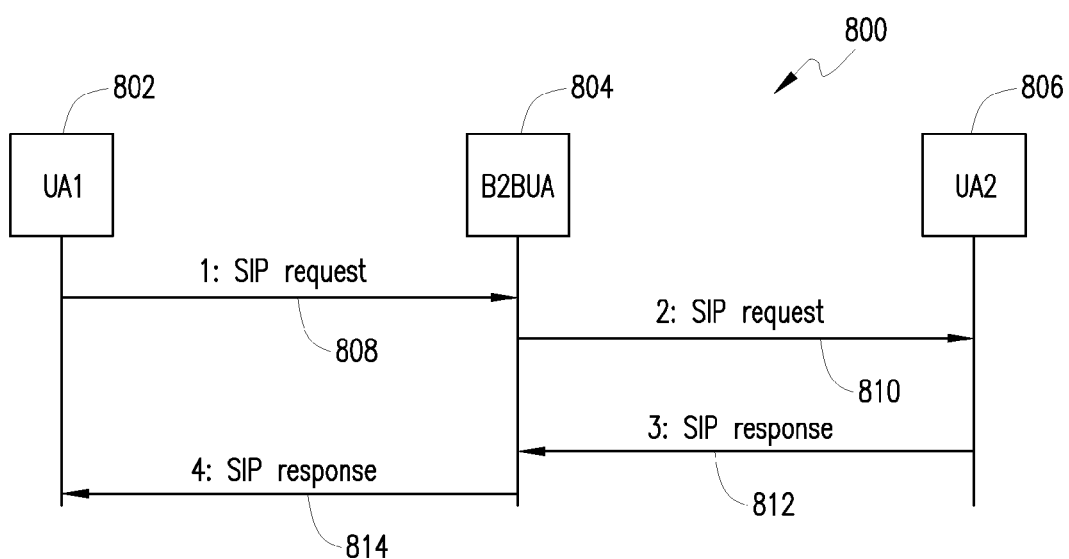
FIG. 8 depicts an exemplary message flow diagram involving multiple entities where an intermediary node is operable to negotiate schema information with respect to upstream and downstream entities according to an embodiment of the present disclosure.

Referring now to FIG. 8, shown therein is an exemplary message flow diagram 800 involving multiple SIP entities wherein an intermediary node is operable to negotiate schema and document version information with respect to upstream and downstream entities according to an embodiment of the present disclosure. UA1 802 is an originator or sender of a request ultimately directed to UA2 806 operating as a recipient. A B2BUA 804 (e.g., a border gateway node such a BGCF or IBCF) is operable as an intermediary node. UA1 802 generates a SIP INVITE request 808 with its Accept header set to:

application/3gpp-ims+xml;sv="1,1.1";ife="ua1"

The intermediary node 804 intercepts the INVITE 808 and modifies the Accept header and generates a new INVITE request 810 towards UA2 806. The modified Accept header now includes the following:

application/3gpp-ims+xml;sv="1,1.1,2.5";ife="ua1",
application/3gpp-ims+xml;sv="2.5";ife=b2bua"

In essence, by modifying the Accept header information as set forth above, the intermediary node 804 conveys that it is operable to convert or otherwise convey the application/3gpp-ims+xml content compliant with schema version 2.5 that is destined to UA1 (on upstream path) into the XML content that is compatible with schema version 1 or 1.1 supported by UA1 802 (insofar as possible; on the other hand, where it is not possible, the unconvertible information may be signaled otherwise). In addition, the intermediary node 804 also signals that it is operable to accept the application/3gpp-ims+xml content according to schema version 2.5 that is destined to the B2BUA. Suitable response messages are 812 and 814 are propagated back on the return path, which messages may or may not include any documents such as those with content-type "application/3gpp-ims+xml" as SIP body or body part(s).

It should be realized that where some of the current versions of the 3GPP standard (i.e., Release 5, Release 6, Release 7 and Release 8 of 3GPP TS 24.229) do not make a provision for UAs to include the "application/3gpp-ims+xml" MIME type explicitly in the Accept header, additional variations may need to be implemented. In order to prevent modification of the deployed Release 5/6/7/8-compliant UAs and require the insertion of "*/*" or "application/*" or "application/3gpp-ims+xml", additional embodiments of the present disclosure provide that a special version indicator (e.g., absence of a version in the schemaversion or sv parameter's value: application/3gpp-ims+xml;sv=" ") or token (e.g., "none") can be reserved to indicate that the content of the aforesaid MIME type is not acceptable by the UA originating the SIP method. The special version token may also be used to signify that absence of "*/*", "application/*" or "application/3gpp-ims+xml", or absence of the "sv" or "schemaversion" parameter while the "application/3gpp-ims+xml" MIME type is present, indicates supportability and application of a default version (e.g., schema version 1 relating to the aforesaid MIME type).

Figure 9:
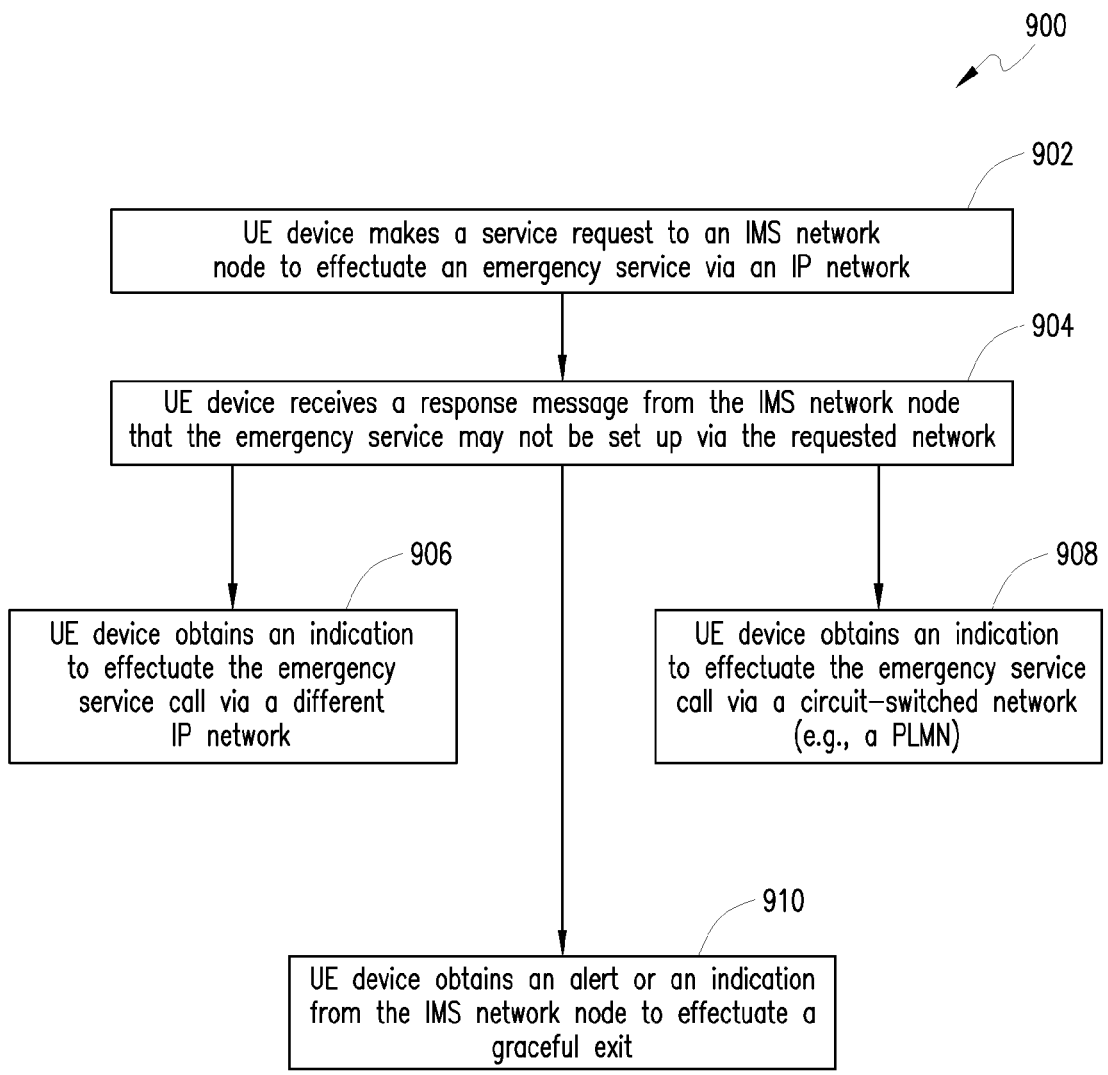
FIG. 9 depicts an exemplary implementation of a telecommunications service (Emergency Services) according to an embodiment of the present disclosure.

FIG. 9 depicts an exemplary implementation of a telecommunications service such as, e.g., an Emergency Services (ES) call, over an IMS network with SIP messaging. As can be appreciated by one skilled in the art, when a UE device wants to make an ES call over the IMS network, the P-CSCF node (typically the first IMS node that the UE device interacts with) may not allow the ES call for a number of reasons. For example, making an ES call over an IP network may be prohibited by the regulatory authorities in a region or country where only ES calls over a conventional CS network are mandated. In some instances, IP-based ES calls can be very expensive and, in addition, there may not be carrier-grade reliability with respect to such calls. In still further scenarios, even where an IP-based ES call is allowed, the IMS network may want to route the call over a different IP network rather than handling it itself. Regardless of the reasons, when different versions of XML message bodies and/or XML schemas are used by the various entities, i.e., the UE device, P-CSCF, etc., with respect to setting up the ES call, there is a possibility that such message bodies or schemas are not compatible, thereby resulting in unpredictable behavior. Not only may the intended ES call not be completed, the requesting UE device may not receive any alert or indication as to any possible alternative course(s) of action.

In the exemplary scheme 900 shown in FIG. 9, the SIP entities are provided with the capability of negotiating version information and of signaling alternative courses of action where needed. Accordingly, when the UE device makes a service request to an IMS node (i.e., the P-CSCF node) to effectuate an ES call via the IP network (block 902), the IMS node is adapted to process the incoming request and execute appropriate service logic to generate a response message that the ES call via the requested network may not be established (block 904). The IMS node is also adapted to provide an indication to the UE device (e.g., via the response message) to effectuate the ES call over an alternative network (e.g., a different IP network) and may include applicable routing information (block 906). In another alternative, the IMS node may be adapted to provide an indication to the UE device that the ES call is to be effectuated over a conventional CS network, which may again include appropriate routing information (block 908). Alternatively or additionally, the IMS node may also provide an alert and/or indication to the UE device that the requested ES call cannot be completed, whereby a graceful exit may be facilitated, including, e.g., a cause code or textual reason encoded as part of the response message as to whether or why an alternative service is suggested by the network (block 910). Further, responsive to the indications included in the response message or due to a local default procedure, the UE device may also interrogate a database (again, either locally provisioned within the UE device or remotely provisioned in the network environment) to obtain appropriate ID and/or routing information with respect to setting up the ES call over the alternative network.

SIP messaging including XML bodies that is typically implemented in an IMS network environment also involves provisioning a Content-Disposition header field in the messages, for example, as alluded to previously. The Content-Disposition header field describes how the message body or, for multipart messages, a message body part is to be interpreted by a UAC or UAS. Various "disposition-types" of the Content-Disposition header are defined for SIP and registered by the IANA. The value "session" indicates that the body part describes a session, for either calls or early (pre-call) media. The value "render" indicates that the body part should be displayed or otherwise rendered to the user. The disposition type "icon" indicates that the body part contains an image suitable as an iconic representation of the caller or callee that could be rendered informationally by a UA entity when a message has been received, or persistently while a dialog takes place. The value "alert" indicates that the body part contains information, such as an audio clip, that should be rendered by the UA entity in an attempt to alert the user to the receipt of a request, generally a request that initiates a dialog.

If the Content-Disposition header field is missing in a SIP message, according to RFC 2161, a default value of "render" may be implemented by the server in order to facilitate compatibility, although the MIME type may determine the default content disposition in certain applications. Also, where there is no MIME type, the default of "render" is typically implemented. Relatedly, a "handling" parameter, handling-param, describes how a UAS should react if it receives a message body whose content type or disposition type it does not understand. Conventionally, the handling parameter has defined values of "optional" and "required".

Although the foregoing rules regarding content disposition may be sufficient in some SIP applications, several issues emerge where the MIME type is "application/3gpp-ims+xml". For example, the default content disposition of rendering is unsuitable with respect to such MIME types. By way of illustration in an ES call scenario described above, if a SIP 380 (Alternative Service) response is provided to indicate an alternative service via an XML body to the requesting UE device, the default disposition of rendering such content is meaningless. Accordingly, further embodiments of the present patent disclosure provide a mechanism for signaling appropriate content disposition whereby rendering is avoided and an appropriate disposition is realized or an appropriate application is invoked by the recipient for processing the contents of a message body. Further, the content disposition signaling mechanism may be modulated to vary the disposition procedures based on the functionality of a recipient. In other words, a receiving UE device may engage in a disposition behavior that is different from the disposition behavior of a receiving network node.

Figure 10A:
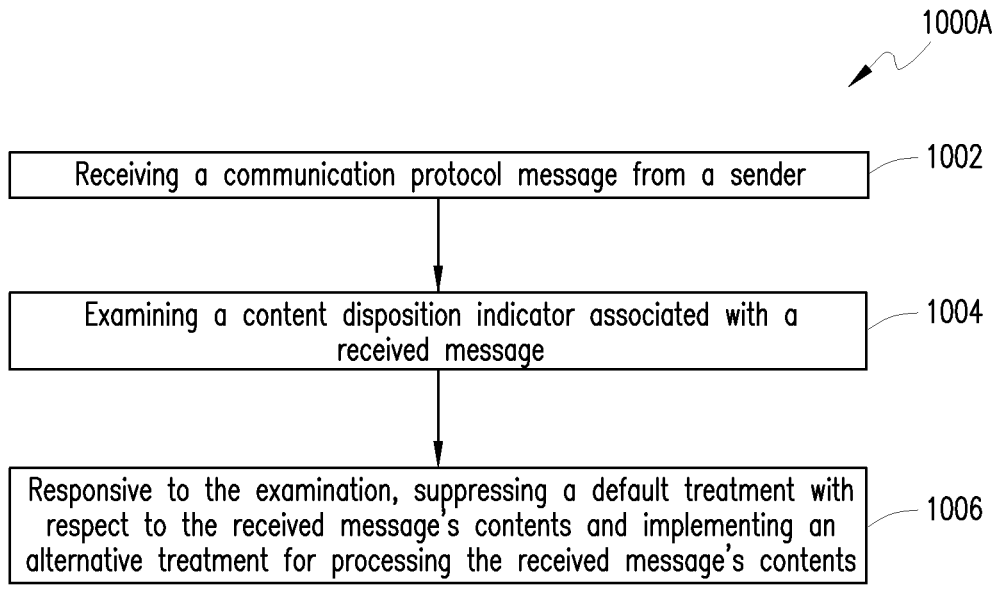
FIGS. 10A-10C depict various embodiments relating to a content disposition scheme for processing and/or interpreting the contents of a message body.
Figure 10B:
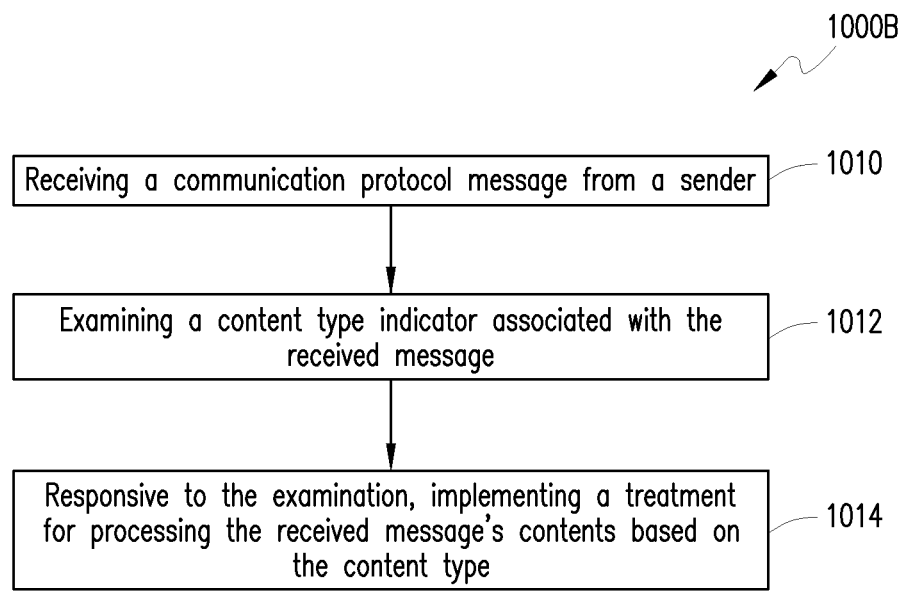
Figure 10C:
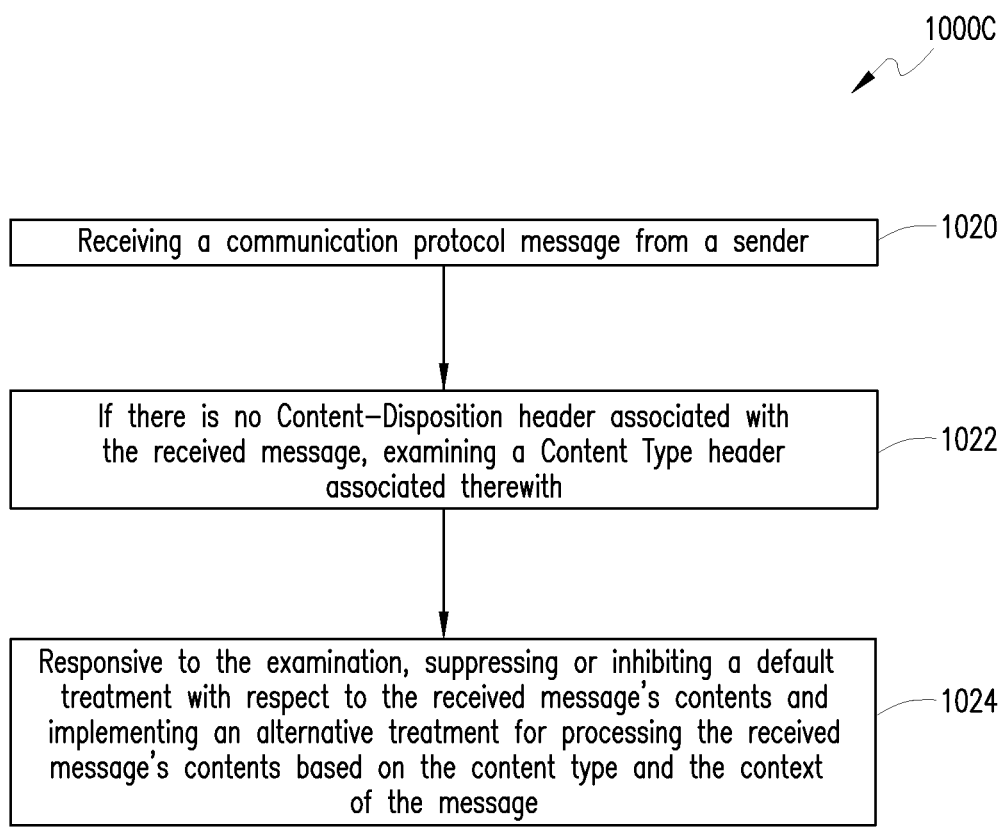

FIGS. 10A-10C depict various embodiments relating to a content disposition scheme for processing and/or interpreting the contents of at least one message body per message, wherein a message body content has a corresponding content type. Reference numeral 1000A in FIG. 10A refers to an exemplary process at a recipient. Upon receiving a message (e.g., a SIP or HTTP message) from a sender (block 1002), an examination takes place with respect to the received message (e.g., a message body or body part) to determine whether there is an indicator (e.g., a content disposition indicator), its values, etc. (block 1004). Responsive to the examination, a default (e.g., a default disposition when the Content-Disposition header is absent) or even an explicitly signaled treatment is inhibited with respect to the contents of the received message. The examination may also indicate ambiguous treatments in some cases. An alternative treatment may be determined (e.g., explicitly signaled in the message (either in a header or within the message body) or configured in the recipient) that the recipient can effectuate for processing the message contents. This determination may be further modified to indicate different dispositions based on the functionality or role of the receiving entity, the context of the received message, any directives included in the body or other headers, and so on. These functions are exemplified in block 1006.

FIG. 10B depicts an embodiment 1000B wherein a content type indicator is used for determining appropriate disposition at a recipient. Upon receiving a communication protocol message (e.g., a SIP or HTTP message) from a sender (block 1010), an examination takes place with respect to the received message (e.g., a message body or body part) to determine whether there is a content type indicator, its values, etc. (block 1012). Responsive to the examination, a treatment may be implemented by the recipient, possibly based on the functionality or role of the receiving entity, the context of the received message, any directives included in the body or other headers, and so on (block 1014). Again, the content type indicator may be signaled in the message (either in a header or within the message body) or via a separate mechanism.

FIG. 10C depicts an embodiment 1000C wherein a determination is based on the absence of a Content-Disposition header. Upon receiving a communication protocol message (e.g., a SIP or HTTP message) from a sender (block 1020), a determination is made if the received message has no Content-Disposition header. Alternatively, if the Content-Disposition header is present, a further determination may be made as to whether it is an empty field. If so, a Content-Type header field is examined. These processes are set forth in block 1022. Responsive to the examination, a default treatment is inhibited with respect to the contents of the received message. An alternative disposition treatment may be implemented by the recipient for processing the message contents, possibly based on the functionality or role of the receiving entity, the context of the received message, any directives included in the body or other headers, and so on (block 1024).

Those skilled in the art will recognize that appropriate message generation processes take place at sender entities with respect to content disposition signaling, which are essentially counterparts to the embodiments set forth above. That is, SIP messages may be generated by senders that include but not limited to suitable content disposition and/or content type indicators, applicable values for Content-Disposition and/or Content-Type header fields, and so on. Additional implementational aspects with respect to the foregoing embodiments are set forth below in detail, again taking particular reference to the SIP-based messaging in 3GPP-compliant IMS network environments for effectuating certain services (e.g., ES calls). As alluded to previously, content according to a particular content type may be added to SIP messages in both directions, i.e., upstream as well as downstream directions. For instance, upstream SIP messages may indicate which MIME types are acceptable using an indicator, e.g., in an Accept header field. If an Accept header field is received by a recipient that contains indications of unsupported content types, a suitable response such as, e.g., a SIP 406 (Not Acceptable) or a SIP 415 (Unsupported Media Type) response, may be generated. Specifically, in the context of IMS, content with the MIME type "application/3gpp-ims+xml" can be sent upstream between an S-CSCF node and an AS node or downstream between a P-CSCF node and a UE device. As further discussed previously, SIP entities may insert or remove the XML message body or parts thereof in either direction. Accordingly, it becomes important that appropriate information be provided in the header fields of SIP messages, e.g., Accept, Content-Disposition, Content-Type, etc., in addition to signaling suitable XML schema and/or document version information so that the message bodies are not only validated but also properly processed.

In one implementation, a lack of explicit version support in the Accept header field may mean that the SIP UA node accepts the lowest version of any MIME type supported either upstream or downstream. On the other hand, if the UA node supports a higher version of the MIME type, it may indicate its support in the Accept header accordingly. In some cases a UAS expects that a UAC can handle certain content types. For example, a P-CSCF node may expect a UE device to accept the content of MIME type "application/3gpp-ims+xml" in case of a non-UE detectable Emergency Session. If the MIME type "application/3gpp-ims+xml" (and its version) is not signaled in the Accept header field, certain interoperability issues can arise. Accordingly, in one scenario, when the P-CSCF node responds with an indication that the CS domain is to be used for making an ES call, assuming that the UE device that will receive the SIP 380 (Alternative Service) response message accepts version 1 of the MIME type compliant with the 3GPP TS 24.229 standard, the P-CSCF node may include in the SIP 380 (Alternative Service) response the following indications or settings: a Content-Type header field having the value set to indicate the compliant MIME type; a Content-Disposition header field set to a value associated with the body's or body part's content type and the expected handling in the recipient and the associated handling parameter set to "required". Further, the P-CSCF node may also include the following in the XML message body: (i) an <alternative-service> element, set to the applicable parameters of the alternative service; (ii) a <type> child element, set to "emergency" to indicate that it is an ES call; and (iii) a <reason> child element, set to an operator configurable reason.

Additionally, a P-CSCF node can handle emergency session establishment within a non-emergency registration scenario. Accordingly, in another implementation, when the P-CSCF node responds with an indication that an emergency registration is required, assuming as before that the UE device that will receive the SIP 380 (Alternative Service) response message accepts version 1 of the MIME type compliant with the 3GPP TS 24.229 standard, the P-CSCF node may include in the SIP 380 response the following indications or settings: a Content-Type header field having the value set to indicate the a value associated with the body's or body part's content type and the expected handling in the recipient. Further, the P-CSCF node may also include the following in the XML message body: (i) an <alternative-service> element, set to the applicable parameters of the alternative service; (ii) a <type> child element, set to "emergency" to indicate that it is an ES call; (iii) an <action> child element, set to "emergency-registration" to indicate that emergency registration is required; and (iv) a <reason> child element, set to an operator configurable reason. It should be noted that the <action> element is used in this implementation only to indicate to the UE device that emergency registration is required. In other contexts, the use of an <action> element may be optional. Also, the SIP 380 (Alternative Service) response message in this implementation may only be sent if the P-CSCF node received an explicit indication from the UE device that it is an emergency session, e.g., by providing the emergency service's Uniform Resource Name (URN) (per RFC 5031) in the Request-URI.

It should be further noted that absence of version values following the "sv" or "schemaversion" attribute or having the explicit indicator or value representing "none" for the "sv" or "schemaversion" attribute or the m-parameter may mean signaling by a UA entity (e.g., the UE device) that it does not accept any version of the IMS XML body that is compliant with the 3GPP TS 24.229 standard. As described in detail previously, XML schema version values may be signaled in a number of ways (e.g., comma-separated digits, ranges of digits, text strings etc.) where the compliant MIME type is added to the Accept header field. If the MIME type is added to the Content-Type header field, the value or values can be used by the XML validator to identify the XML schema and its version needed against which a message body can be validated. On the other hand, XML documents that do not have version attributes for this purpose may be provided with a defined namespace. In specific reference to the SIP 380 (Alternative Service) response, if the contents of the 380 (Alternative Service) response are not understood by a recipient, an ACK message may be generated towards the sender of the SIP 380 response, possibly including an error indicator with an explanation or reason. As a further variation, a UA entity (e.g., a UE device) can also include an Accept header field to provide an indication that it is willing to receive Session Description Protocol (SDP) content as well as any of the MIME types it is capable of processing.

An exemplary Content-Disposition header field in the ABNF form is set forth below in Table 7:

TABLE 7

| Content-Disposition = | "Content-Disposition" HCOLON disp-type *( SEMI disp-param ) |
|---|---|
| disp-type = | "render" / "session" / "icon" / "alert" / "X- process" / disp-extension-token |
| disp-param = | handling-param / generic-param |
| handling-param = | "handling" EQUAL ( "optional" / "required" / other-handling ) |
| other-handling = | "X-process" / token |
| disp-extension-token = | "X-process" / token |

It should be recognized that "X-process" is a process extension that is to be applied when indicated in the "disp-type", and such a process may comprise a private value defined bilaterally between two cooperating agents without outside registration or standardization. A desired disposition process may be given any name to indicate a certain behavior, and other names could also be used to indicate the same behavior. Furthermore, the Content-Disposition header field may also contain other indications or properties to signal other types of functionalities including but not limited to: (i) the XML document should be processed by a specific function; (ii) the XML document should be processed by a specific application; (iii) the XML document should be processed by a specific application in a specific function; (iv) the XML document is originated from a specific function; (v) the XML document is originated from a specific application in a specific function; and (vi) the XML document is to be processed in accordance with certain standards and sections therein. As an illustration, the SIP 380 (Alternative Service) response message could be used to indicate an ES call or it could be used to inform a function that it needs to change from one radio access technology (RAT) and/or domain to another. Clearly, other properties and any combinations of the foregoing properties may be implemented as well.

A disp-type value of "process" or "X-process" or some other generic value may be provided to include indications to signal the execution of directives, scripts, etc. under different conditions, e.g., (i) the functional element (e.g., any UA entity but not limited thereto) decides to add a Content-Disposition header and no other suitable value is defined; (ii) the functional element (e.g., any UA entity but not limited thereto) is required to add a Content-Disposition header (to override a default behavior such as, e.g., rendering the content); (iii) the functional element (e.g., any UA entity but not limited thereto) wants to set the handling parameter associated with a Content-Disposition header field to "required" or "optional" explicitly; or (iv) any combination of the above.

Exemplary disposition process names may be set forth as follows: (i) 3gpp-alternative-service: indicates that the P-CSCF is sending the message body; (ii) 3gpp-emergency: indicates that the P-CSCF is sending the message body and the XML document contains directives, script(s) or other information for an ES call or application; and (iii) 3gpp-service-info: indicates that the XML content is for the AS node receiving the message body. It should be noted that multiple content disposition values may be allowed to implement combinations of processes. For instance, a process named "3gpp-emergency, alert" is operable to indicate an ES call over the CS domain as well as to provide a notification to the user of such call.

The content-disposition value names set forth above are operable to inform the recipient that the contents of the MIME type "application/3gpp-ims+xml" is to be processed in a particular way. Specifically, as an example, it might be to signal the setting up of an ES call on a CS network or performing an emergency registration. The handling of the "process" may include a short time-out, enough for a user to realize an emergency number was recognized although it wasn't intended. In this manner, inadvertent ES calls may be avoided. Additionally, the processes set forth herein would also allow a network node (e.g., AS node) or a UE device without a Man-Machine Interface (MMI) to prevent rendering of the contents of an emergency call indicator (e.g., SIP 380 (Alternative Service) response), thereby not conflicting with the intended processing. However, selective rendering of certain textual or audiovisual information may be allowed where possible and/or useful. For instance, for the MIME type "application/3gpp-ims+xml", the value "render" may signal to the UE device to present or indicate the contents of the <reason> XML element (having textual information). Likewise, for the MIME type "application/3gpp-ims+xml", the value "alert" may signal to the UE device to alert the user.

In one embodiment, 3GPP TS 24.229 may be enhanced as follows with a default behavior for applying a specific Content-Disposition header field disposition type values upon receiving a body in a well-defined context. It should be noted that different default Content-Disposition header field disposition type values may apply for different contexts.

In a further enhancement of the above embodiment, 3GPP TS 24.229 may be enhanced to even override/ignore a Content-Disposition header field disposition type value present in the SIP message and simply executing the default Content-Disposition header field disposition type value for that context. This embodiment may be exemplified as follows:

Upon receiving a 380 (Alternative Service) response to the INVITE request, with the 380 (Alternative Service) response including a IM CN subsystem XML body, with the type element set to "emergency" and the action element set to "emergency-registration" the UE shall:
apply the content-disposition of "3gpp-alternative-service" (see subclause 7.2A.11 in 3GPP TS 24.229);
perform an initial emergency registration using a different VPLMN if available, as described in subclause 5.1.6.2 in 3GPP TS 24.229 and if the new emergency registration succeeded, attempt an emergency call as described in this subclause;
attempt emergency call via CS domain according to the procedures described in 3GPP TS 24.008, if available and not already tried; or
perform implementation specific actions to establish the emergency call.

Or as follows:
Upon receiving a 380 (Alternative Service) response to the INVITE request, with the 380 (Alternative Service) response include a IM CN subsystem XML body, with the type element set to "emergency" and the action element set to "emergency-registration" the UE shall:
apply the content-disposition of "3gpp-alternative-service" (see subclause 7.2A.11 in 3GPP TS 24.229);
perform an initial emergency registration, as described in subclause 5.1.6.2 in 3GPP TS 24.229 and attempt an emergency call as described in subclause 5.1.6.8.3 in 3GPP TS 24.229;
attempt emergency call via CS domain according to the procedures described in 3GPP TS 24.008, if available and not already tried; or
perform implementation specific actions to establish the emergency call.

The Content-Disposition header field disposition type values 3gpp-alternative-service and 3gpp-service-info have been defined as follows:
3gpp-alternative-service is used with Content-Type application/3gpp-ims+xml when the element <alternative-service> is included.
3gpp-service-info is used with Content-Type application/3gpp-ims+xml when the element <service-info> is included.

In some implementations, it is possible to include multiple content dispositions within a SIP message. Set forth below is an example in Table 8.

TABLE 8

Content-Type: multipart/mixed; boundary=outer
    Content-Description: multipart-1
    --outer
      Content-Type: text/plain
      Content-Disposition: inline
      Content-Description: text-part-1
      <<text goes here>>
    --outer
      Content-Type: multipart/mixed; boundary=inner
      Content-Disposition: attachment
      Content-Description: multipart-2
        --inner
          Content-Type: text/plain
          Content-Disposition: inline
          Content-Description: text-part-2
          <<more text here>>
        --inner
          Content-Type: image/jpeg
          Content-Disposition: attachment
          Content-Description: jpeg-1
          <jpeg data>
        --inner-
    --outer- As alluded to previously with respect to an exemplary implementation of an Emergency Services (ES) call (see FIG. 9), the SIP 380 (Alternative Service) response message from the IMS network node may be provided with the capability to signal to the receiving UE device various functional indications such as, e.g., trying again over a PLMN or another PS network to make the ES call, specifying one or more RATs to use, or provide an additional XML body with another content disposition value to indicate execution of a profile in the UE device. For example, the SIP 380 (Alternative Service) response message may signal by sending an "alert" element and when the UE devices receives that indication, it triggers execution of a pre-configured stored profile with respect to the ES call. An exemplary profile may involve playing tones, beeps, etc., as well as displaying textual messages/instructions on the display screen to the user (e.g., retry the emergency call). In a still further variation, the XML body of the SIP 380 (Alternative Service) response may actually contain a profile that is provided to the UE device, which may be executed to indicate what the UE device should do.

In a more generalized manner, it should be realized that the foregoing treatments with respect to the SIP 380 (Alternative Service) responses may be implemented in any SIP message (e.g., any but not restricted to those that include an address of an emergency session not detected by the UE device and not expressed as an address according to some Private Number Plan or PNP). It should be appreciated that private numbering information may be sent in the Request-URI of the outgoing SIP requests, using one of the following formats: (i) a TEL URI in compliance with RFC 3966, with a local number followed by a phone-context value; (ii) a SIP URI in compliance with RFC 3261, with the user=phone parameter; (iii) a SIP URI in compliance with RFC 3261 and RFC 4967, with the user=dialstring parameter; and (iv) a SIP URI in compliance with RFC 3261, where the user part contains the private numbering information and the domain name is specific enough to enable the network to understand that the user part contains private numbering information. Additionally, when the disposition type is not understood or it mismatches with the range of expected disposition types for a corresponding content type, a SIP 400 or 4xx response may be sent.

Analogous to the effects of absence of correct information in an Accept header or of having unexpected content in a message body as set forth in the foregoing sections, there may be a number of potential error scenarios with respect to the Content-Disposition header as well. These scenarios can be roughly categorized as follows, for example: (i) the Content-Disposition header is present but unknown; (ii) the Content-Disposition header is present but unknown, yet with known a parameter; (iii) the Content-Disposition header is present but inappropriate; and (iv) the Content-Disposition header is not present (i.e., absent).

Similar to the teachings in previous sections, where a UA entity or proxy has no MMI or is aware that a message body is not supposed to be rendered by the recipient, it can potentially be unclear as to how the UA entity can effectively benefit from a filename parameter or other information in the SIP method that requires interaction with the user via a suitable MMI. As before, one exemplary implementation may involve providing a local preference setting with appropriate defaults, e.g., per MIME type, Content-Disposition and its parametric value. Another variation may involve providing additional treatments in cases where certain headers (e.g., Content-Encoding) are present or where certain information is present in the requested SIP method.

Set forth below is an example illustrative of a default treatment modification, where a SIP 380 (Alternative Service) response message is received with Content-Type "application/3gpp-ims+xml", the default treatment (i.e., render in the absence of another value) is overridden, and "3gpp-alternative-service" may be applied independent of the value or presence of the Content-Disposition header field:

TABLE 9

| | |
|---|---|
| SIP method == | 380 |
| SIP header field == | (content-type == "application/3gpp-ims+xml") |
| SIP header field | content-disposition := "3gpp-alternative-service" |
| SIP header field value | |
| SIP header field value parameter | |
| SIP header field value parameter value | |
| SIP header field parameter | |
| SIP header field parameter value | |

The above treatment exemplifies a default content disposition process having the name "3gpp-alternative-service". By providing a specific name-based disposition process, the default treatment or header value information may be overridden or ignored in some cases, especially in the case of SIP message bodies that contain directives or scripts unsuitable for rendering. Other conditions may also be evaluated prior to overriding or ignoring a (default) content disposition value, for example, the presence or value of other SIP headers, values, parameters, body part(s), body (part) values, etc. This table could be different for different UAs and enables one UA representing a certain functional element (e.g., a UE device) apply a different content-deposition than the content-deposition applied by another UA representing a certain functional element (e.g. an AS node).

The default treatment information illustrated in Tables above may be provisioned by operators, third parties, subscribers, or in any combination. In one implementation, such tables may be expressed in the same structure as the initial filter criteria (IFC), or by way of a suitable common policy framework or via Service Books or using Open Mobile Alliance (OMA) Device Management (DM) or otherwise (including, e.g., the disposition being hard-coded). Default treatment tables may be downloaded to the UA entities using the OMA Device Management procedures, possibly via transport mechanisms such as, e.g., Unstructured Supplementary Service Data (USSD), Short Messaging Service (SMS), Multimedia Broadcast Multicast Service (MBMS), IP, and so on.

Accordingly, a content disposition policy manager may be provisioned in a SIP UA entity that defines a set of policies with respect to default treatment options for different types of contents, etc. For instance, if a SIP message is received with a certain content type, the default behavior is dependent on the disposition value in accordance with a policy structure managed by the UA. Set forth below in Table 10 is an exemplary policy structure:

TABLE 10

| |
|---|
| Content type <value> - 1 |
| Accepted disposition values <value> - 2 |
| Rejected disposition values <value> - 3 |
| Ignore disposition values <values> - 4 |
| Default value to take <value> - 5 |
| None received - 6 |
| Default value to take <value> - 7 |

The foregoing example provides that if the UA receives a message with content type (1), then the UA is to examine the disposition value, if received. The policy hierarchy then executes as follows: (i) accepted disposition values (2) which, if received, direct that the UA entity to perform/process in accordance any known standard (e.g., applicable IETF standards, 3GPP standards, etc.); (ii) rejected disposition values (3) received for the content type, which direct the UA entity to reject the message bodies in entirety or to ignore portions following specific MIME types; (iii) ignored disposition values (4), where the UA entity is directed to apply a default handling disposition value (5), if received; (iv) no disposition (6) is received, where the UA entity is directed to apply another default handling disposition value (7).

With respect to the various potential error scenarios relating to the Content-Disposition header field, additional implementations may be found in the following prior U.S. provisional patent application: "SIP CONTENT DISPOSITION HEADER SYSTEM AND METHOD," Application No. 61/015,003, filed Dec. 19, 2007, in the name(s) of Jan John- Luc Bakker, Adrian Buckley and Andrew Allen, which is incorporated by reference herein. In general, the embodiments provide a scheme wherein appropriate values can be assigned to the header even where they are absent, based on local UA conditions, configurations, and policy management.

Additionally, contexualized content disposition is also provided where some content types may trigger or require different behavior depending on the context. For example, content type "application/3gpp-ims+xml" in a SIP 380 response message may be mandated to cause the initiation of an ES call/session setup when received with some data values on a UE device. On the other hand, when the same content type with different data is received at an AS node in a SIP INVITE message, it informs the application on the AS node of certain subscriber information. In both cases "rendering" is inappropriate; however, a single default policy cannot be applied given the two different applications of the same MIME type. Accordingly, a context-specific default treatment process may be specified for the UE and AS nodes, respectively, as set forth in the embodiments described above.

Figure 11:
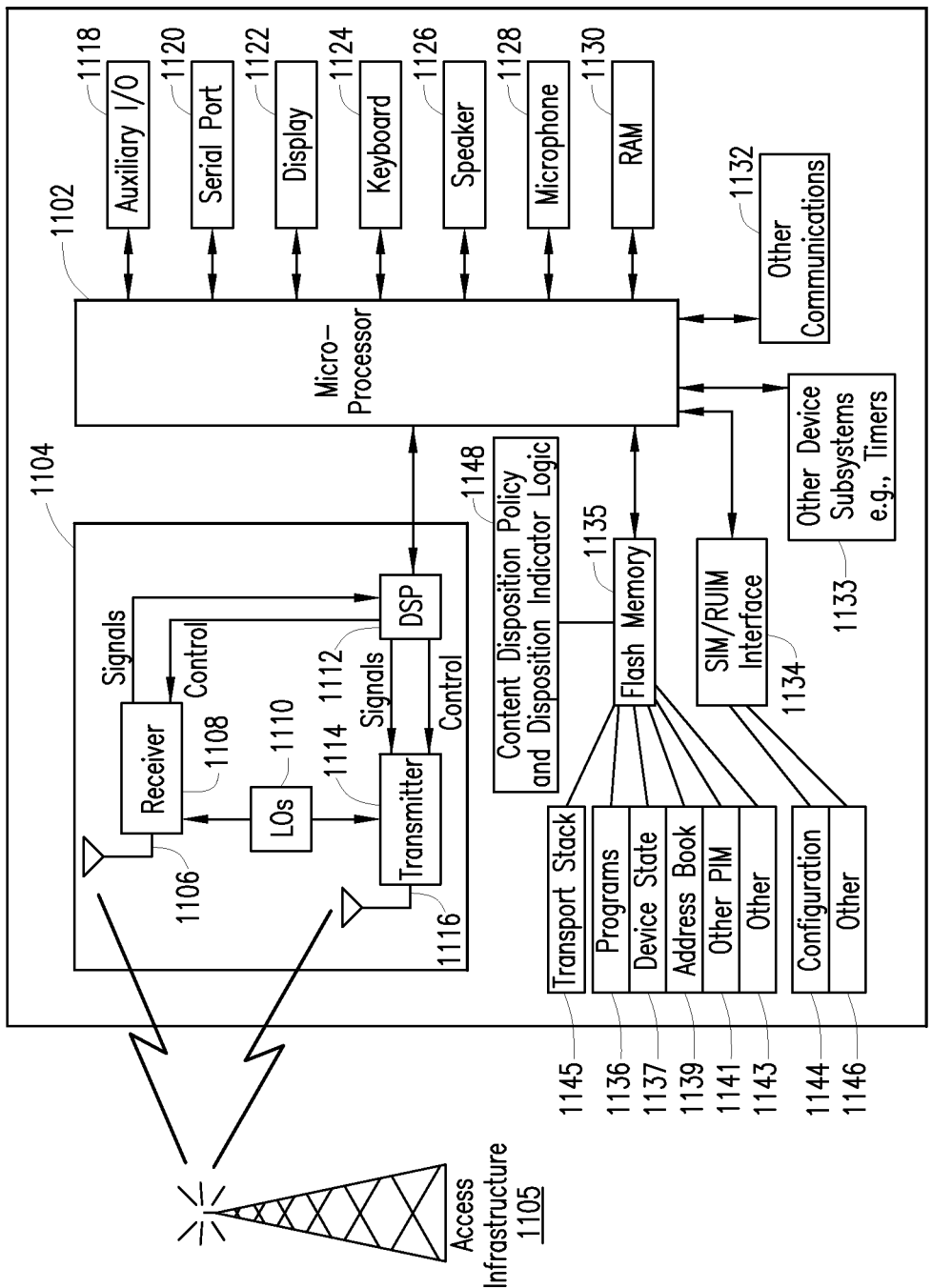
FIG. 11 is a block diagram that depicts additional details of an embodiment of a communications device operable for purposes of the present patent disclosure.

FIG. 11 depicts a block diagram of an embodiment of a communications device operable as an SIP-compatible UE device, e.g., UE 102, for purposes of the present patent disclosure. It will be recognized by those skilled in the art upon reference hereto that although an embodiment of UE 102 may comprise an arrangement similar to one shown in FIG. 11, there can be a number of variations and modifications, in hardware, software or firmware, with respect to the various modules depicted. Accordingly, the arrangement of FIG. 11 should be taken as illustrative rather than limiting with respect to the embodiments of the present patent disclosure. A microprocessor 1102 providing for the overall control of an embodiment of the UE device is operably coupled to a communication subsystem 1104 that may be capable of multimode communications (e.g., CS domain, IP domain such as IMS, et cetera). The communication subsystem 1104 generally includes one or more receivers 1108 and one or more transmitters 1114 as well as associated components such as one or more local oscillator (LO) modules 1110 and a processing module such as a digital signal processor (DSP) 1112. As will be apparent to those skilled in the field of communications, the particular design of the communication module 1104 may be dependent upon the communications networks with which the mobile device is intended to operate (e.g., a CDMA network, a GSM network, WLAN, et cetera). Regardless of the particular design, however, signals received by antenna 1106 through appropriate access infrastructure 1105 (e.g., cellular base station towers, WLAN hot spots, etc.) are provided to receiver 1108, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 1112, and provided to transmitter 1114 for digital-to-analog (D/A) conversion, frequency up conversion, filtering, amplification and transmission over the air-radio interface via antenna 1116.

Microprocessor 1102 may also interface with further device subsystems such as auxiliary input/output (I/O) 1118, serial port 1120, display 1122, keyboard/keypad 1124, speaker 1126, microphone 1128, random access memory (RAM) 1130, a short-range communications subsystem 1132, and any other device subsystems, e.g., timer mechanisms, generally labeled as reference numeral 1133. To control access, an interface 1134 may also be provided in communication with the microprocessor 1102 with respect to a removable storage module (Universal/Subscriber Identity Module (U/SIM) or Removable User Identity Module (RUIM)). In one implementation, U/SIM or RUIM interface 1134 may be operable with a U/SIM or RUIM card having a number of key configurations 1144 and other information 1146 such as default content disposition profiles, policy managers, alternative network information, as well as identification and subscriber-related data that may supplement local storage-based information.

Operating system software and applicable service logic software may be embodied in a persistent storage module (i.e., non-volatile storage) such as Flash memory 1135. In one implementation, Flash memory 1135 may be segregated into different areas, e.g., storage area for computer programs 1136 (e.g., service processing logic), as well as data storage regions such as device state 1137, address book 1139, other personal information manager (PIM) data 1141, and other data storage areas generally labeled as reference numeral 1143. A transport stack 1145 may be provided to effectuate one or more appropriate radio-packet transport protocols. In addition, a content disposition policy manager and disposition indicator logic module 1148, along with an XML schema validator and version negotiation logic block in some implementations, is provided for facilitating one or more embodiments as set forth in detail hereinabove.

It should be appreciated that the various operations, components and processes set forth in the present patent disclosure, operable either at the UE device, the IMS network node, or at other network locations, may be accomplished via a number of means, including software (e.g., program code or sequence of instructions), firmware, hardware, or in any combination, usually in association with a processing system, as components configured to perform specific functions. Where the processes are embodied in software, such software may comprise program instructions that form a computer program product, instructions on computer-accessible media, uploadable service application software, or software downloadable from a remote station, and the like. Further, where the processes, data structures, or both, are stored in computer-accessible storage, such storage may include semiconductor memory, internal and external computer storage media and encompasses, but not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer-executable medium."

Furthermore, although the embodiments set forth herein have been described in detail with respect to SIP-based messaging in 3GPP-compliant networks, it will be recognized that the teachings of the present patent disclosure may be applied to other distributed environments involving different protocols (e.g., HTTP). Likewise, the teachings herein may also be applied in respect of other Markup languages where versioned bodies are possible and some sort of a meta-structure is used for validation of such bodies.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method, comprising:
receiving, from User Equipment (UE) device, a Session Initiation Protocol (SIP) request message via a first IP network by a network node;
transmitting a SIP response message by the network node via the first IP network, the SIP response message being responsive to the SIP request message and including at least one message body content in the SIP response message's body, the SIP response message further includes a content type indicator for the at least one message body content; and
wherein the UE device provides, by one or more processors, a treatment for the at least one message body content based on a value of the content type indicator independent of at least one of an absence of a content disposition indicator, a content disposition indicator without a value, or a content disposition indicator having a value, the treatment, applied by the UE device, comprising one of: (i) performing an Emergency Services (ES) call effectuated via a circuit-switched network; or (ii) performing a registration and an ES call effectuated via an IP network, wherein the registration involves sending a SIP REGISTER message.

2. The method of claim 1, wherein the SIP response message's body comprises at least one directive.

3. The method of claim 1, wherein the SIP response message's body comprises an Extensible Markup Language (XML) document.

4. The method of claim 1, wherein the content type is an XML media type or an XML-Based Media Type.

5. The method of claim 4, wherein the XML media type or the XML-Based Media Type is defined by an XML schema.

6. The method of claim 1, wherein the content disposition indicator is provided in a Content-Disposition header field.

7. The method of claim 6, wherein the content type indicator is provided in a Content-Type header field.

8. The method of claim 7, wherein each of the Content-Disposition header field and the Content-Type header field takes on a value comprising textual information.

9. The method of claim 1, wherein the IP network comprises a second IP network.

10. The method of claim 1, wherein the treatment comprises providing an indication to a user.

11. A network node, comprising:
a receiver configured to receive, from User Equipment (UE) device, a Session Initiation Protocol (SIP) request message via a first IP network;
a transmitter configured to transmit a SIP response message by the network node via the first IP network, the SIP response message being responsive to the SIP request message and including at least one message body content in the SIP response message's body, the SIP response message further includes a content type indicator for the at least one message body content; and
wherein the UE device provides, by one or more processors, a treatment for the at least one message body content based on a value of the content type indicator independent of at least one of an absence of a content disposition indicator, a content disposition indicator without a value, or a content disposition indicator having a value, the treatment, applied by the UE device, comprising one of: (i) performing an Emergency Services (ES) call effectuated via a circuit-switched network; or (ii) performing a registration and an ES call effectuated via an IP network, wherein the registration involves sending a SIP REGISTER message.

12. The network node of claim 11, wherein the SIP response message's body comprises at least one directive.

13. The network node of claim 11, wherein the SIP response message's body comprises an Extensible Markup Language (XML) document.

14. The network node of claim 11, wherein the content type is an XML media type or an XML-Based Media Type.

15. The network node of claim 14, wherein the XML media type or the XML-Based Media Type is defined by an XML schema.

16. The network node of claim 11, wherein the content disposition indicator is provided in a Content-Disposition header field.

17. The network node of claim 16, wherein the content type indicator is provided in a Content-Type header field.

18. The network node of claim 17, wherein each of the Content-Disposition header field and the Content-Type header field takes on a value comprising textual information.

19. The network node of claim 11, wherein the IP network comprises a second IP network.

20. The network node of claim 11, wherein the treatment comprises providing an indication to a user.

* * * * *